(12) United States Patent
Cho et al.

(10) Patent No.: US 11,796,678 B2
(45) Date of Patent: Oct. 24, 2023

(54) OPTICAL DEVICE AND LIDAR SYSTEM INCLUDING THE SAME

(71) Applicant: SAMSUNG ELECTRONICS CO., LTD., Suwon-si (KR)

(72) Inventors: Yongchul Cho, Suwon-si (KR); Jungwoo Kim, Hwaseong-si (KR); Tatsuhiro Otsuka, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 693 days.

(21) Appl. No.: 16/843,387

(22) Filed: Apr. 8, 2020

(65) Prior Publication Data

US 2021/0109222 A1 Apr. 15, 2021

(30) Foreign Application Priority Data

Oct. 11, 2019 (KR) .......................... 10-2019-0126288

(51) Int. Cl.
| | |
|---|---|
| *G02B 26/10* | (2006.01) |
| *G01S 17/88* | (2006.01) |
| *G01S 7/481* | (2006.01) |
| *G02B 27/30* | (2006.01) |

(52) U.S. Cl.
CPC ............ *G01S 17/88* (2013.01); *G01S 7/4817* (2013.01); *G02B 26/105* (2013.01); *G02B 26/108* (2013.01); *G02B 27/30* (2013.01)

(58) Field of Classification Search
CPC ...... G01S 17/88; G01S 7/4817; G01S 7/4815; G01S 7/4814; G02B 26/105; G02B 26/108; G02B 27/30; G02B 26/123; G02B 26/124; G02B 26/10; G02B 27/18
See application file for complete search history.

(56) References Cited

U.S. PATENT DOCUMENTS

| | | |
|---|---|---|
| 3,764,192 A | 10/1973 | Wheeler |
| 3,287,559 A | 11/1996 | Barnes |
| 5,864,391 A | 1/1999 | Hosokawa et al. |
| 6,292,285 B1 | 9/2001 | Wang et al. |
| 7,544,945 B2 | 6/2009 | Tan et al. |
| 7,869,112 B2 | 1/2011 | Borchers et al. |

(Continued)

FOREIGN PATENT DOCUMENTS

| | | |
|---|---|---|
| EP | 0492730 A1 | 12/1991 |
| JP | H07-25065 A | 1/1995 |

OTHER PUBLICATIONS

Velodyne LiDAR, Inc. "B User Manual and Programming Guide" VLP-16, Mar. 2016 (49 pages total).

(Continued)

*Primary Examiner* — Euncha P Cherry
(74) *Attorney, Agent, or Firm* — Sughrue Mion, PLLC

(57) ABSTRACT

An optical device according to an embodiment may include: a plurality of light sources configured to emit laser beams; a light direction changing unit comprising at least one of a prism and a mirror, provided on traveling paths of the laser beams, and configured to focus the laser beams at one point by changing travelling directions of the laser beams to form constant angles between the traveling paths of the laser beams; and a scanning mirror configured to perform two-dimensional scanning by reflecting the laser beams received from the light direction changing unit.

28 Claims, 24 Drawing Sheets

(56) References Cited

U.S. PATENT DOCUMENTS

| | | | |
|---|---|---|---|
| 8,174,749 B2 | 5/2012 | Stenton | |
| 8,251,517 B2 * | 8/2012 | Gibson | H04N 9/3129 |
| | | | 353/50 |
| 8,994,928 B2 | 3/2015 | Shiraishi | |
| 9,128,190 B1 | 9/2015 | Ulrich et al. | |
| 9,188,674 B2 | 11/2015 | Suzuki et al. | |
| 2007/0181810 A1 | 8/2007 | Tan et al. | |
| 2014/0009747 A1 | 1/2014 | Suzuki et al. | |
| 2018/0143306 A1 | 5/2018 | Elooz et al. | |
| 2019/0101627 A1 | 4/2019 | Hansson et al. | |
| 2019/0271767 A1 * | 9/2019 | Keilaf | G01S 7/4815 |

OTHER PUBLICATIONS

Kota Ito et al., "System Design and Performance Characterization of a MEMS-Based Laser Scanning Time-of-Flight Sensor Based on a 256×64-pixel Single-Photon Imager" IEEE Photonics Journal, vol. 5, No. 2, Apr. 2013, (15 pages total).

* cited by examiner

OPTICAL DEVICE AND LIDAR SYSTEM INCLUDING THE SAME

CROSS-REFERENCE TO RELATED APPLICATION

This application claims priority from Korean Patent Application No. 10-2019-0126288, filed on Oct. 11, 2019 in the Korean Intellectual Property Office, the disclosure of which is incorporated herein by reference in its entirety.

BACKGROUND

1. Field

Apparatuses and methods consistent with example embodiments relate to optical devices and Light Detection and Ranging (LiDAR) systems including the same.

2. Description of Related Art

LiDAR is a technology of measuring a light distance from an object by radiating light onto the object, receiving light reflected from the object, and analyzing the light. A method of measuring a distance by using the LiDAR includes a time of flight (TOF) method that calculates the distance by multiplying a speed of light and the time it takes to travel back and forth between a transmitter of the LiDAR and the object. The TOF method may be largely classified into mechanical and non-mechanical methods according to a method of controlling a traveling direction of light radiated to an object from a transmitter.

The mechanical method is a method of securing a wide viewing angle by rotating a component of a transmitter by using a rotational force of a motor. The method of rotating the component of the transmitter may include a method of rotating a reflection mirror, an oscillating mirror method, a scanning method using an optical refraction element, and the like.

The LiDAR system may be applied to obtain a three-dimensional distance image in advanced driver-assistance systems (ADAS) or autonomous vehicle. In autonomous driving, more than 40 vertical channels may be required to achieve high resolution.

SUMMARY

Provided are optical devices having an increased number of vertical channels and LiDAR systems including the same.

Additional aspects will be set forth in part in the description which follows and, in part, will be apparent from the description, or may be learned by practice of the presented embodiments of the disclosure.

According to an aspect of an embodiment, an optical device may include: a plurality of light sources configured to emit laser beams; a light direction changing unit comprising at least one of a prism and a mirror, provided on traveling paths of the laser beams, and configured to focus the laser beams at one point by changing travelling directions of the laser beams so as to form constant angles between the traveling paths of the laser beams; and a scanning mirror configured to perform two-dimensional scanning by reflecting the laser beams received from the light direction changing unit.

The light direction changing unit may focus the laser beams on the one point located the scanning mirror.

The optical device may further include: a plurality of first collimators provided one by one on the traveling paths of the laser beams between the plurality of light sources and the light direction changing unit to reduce a first spread angle in a first axial direction of the laser beams; and a plurality of second collimators provided one by one on the traveling paths of the laser beams between the plurality of first collimators and the light direction changing unit to reduce a second spread angle in a second axial direction of the laser beams. The second axial direction is different from the first axial direction.

The plurality of light sources may be arranged to be separated from each other in a vertical direction so that the traveling paths of the emitted laser beams are parallel in a horizontal direction.

The plurality of light sources may be arranged at equal intervals in the vertical direction.

The scanning mirror may include a rotation mirror configured to rotate in both directions about first and second axes that are perpendicular to the first axis.

A first angle range of rotation of the rotation mirror with respect to the first axis may be in a range from 0° to $M*\beta$ degrees, and an angle range of rotation of the rotation mirror with respect to the second axis may be in a range from −90 degrees to +90 degrees, wherein M denotes a natural number, and $\beta$ denotes an angle.

The number of the plurality of light sources may be N (N is a natural number), and the number of vertical channels of the scan area by the optical device may be $N*M$.

The light direction changing unit may include a plurality of prisms, including the prism, respectively provided on the traveling paths of the laser beams emitted from the plurality of light sources.

Two prisms, from among the plurality of prisms, provided at positions symmetrical with respect to the center of the light direction changing unit may have an exit surface of the same inclination angle.

A first inclination angle of a first exit surface of a prism, from among the plurality of prisms, disposed relatively far from the center of the light direction changing unit may be greater than a second inclination angle of a second exit surface of a prism disposed relatively close to the center of the light direction changing unit.

A first distance between a first prism, from among the plurality of prisms, disposed relatively outside with respect to the center of the light direction changing unit and the second collimator adjacent thereto may be greater than a second distance between a second prism, from among the plurality of prisms, disposed relatively inside and the second collimator adjacent thereto.

The plurality of prisms may be arranged so that an inclination angle of an exit surface of each prism is sequentially increased in the vertical direction.

The plurality of prisms may be arranged so that distances between each prism and the point where the laser beams are focused are equal.

The mirror may be of a plurality of mirrors, and the light direction changing unit may include the plurality of mirrors.

The plurality of first collimators and the plurality of second collimators may include cylindrical lenses.

The plurality of first collimators may be integrally formed.

A first collimator of the plurality of first collimators and a second collimator of the plurality of second collimators adjacent to the first collimator in the travelling directions of the laser beams may be integrally formed.

The optical device may further include a first aperture provided between the plurality of light sources and the plurality of first collimators to suppress divergence of the laser beams; and a second aperture provided between the plurality of second collimators and the light direction changing unit to suppress divergence of the laser beams.

The scanning mirror may include a polygon mirror having M reflection surfaces of different inclination angles (where, M is a natural number).

The optical device may further include a plurality of second light sources and a second light direction changing unit that are disposed at positions symmetrical with the plurality of light sources and the light direction changing unit with the polygon mirror, wherein the polygon mirror may be disposed at a center between the positions of the plurality of second light sources and the second light direction changing unit and positions of the plurality of light sources and the light direction changing unit.

The optical device may further include:
a first reflection mirror configured to reflect a first laser beam of the laser beams received from the light direction changing unit so that the laser beam is incident on a first reflecting surface of the polygon mirror; and a second reflection mirror that reflects a second laser beam of the laser beams received from the second light direction changing unit so that the second laser beam is incident on a second reflection surface different from the first reflection surface of the polygon mirror.

The first reflection mirror and the second reflection mirror may be arranged to be misaligned from each other so that the number of vertical channels of the optical device is increased.

The first reflection mirror and the second reflection mirror may be arranged with angles to increase a total horizontal viewing angle by separating a first horizontal viewing angle by the first laser beam reflected by the first reflection mirror from a second horizontal viewing angle of the second laser beam reflected by the second reflection mirror.

The optical device may further include a controller configured to generate driving signals for driving the plurality of light sources.

The controller may be further configured to selectively transmit the driving signals to at least two light sources separated from each other by at least one light source disposed between the at least two light sources, among the plurality of light sources.

According to another aspect of an embodiment, a light detection and ranging (LiDAR) system may include: an optical device of configured to emit laser beams towards an object; and a detector configured to receive the laser beams reflected from the object, wherein the optical device may include: a plurality of light sources configured to emit the laser beams; a light direction changing unit comprising at least one of a prism and a mirror, provided on traveling paths of the laser beams, and configured to focus the laser beams at one point by changing travelling directions of the laser beams to form constant angles between the traveling paths of the laser beams; and a scanning mirror configured to perform two-dimensional scanning by reflecting the laser beams received from the light direction changing unit.

The detector may be provided at a position where the laser beams reflected from the object are directly received.

The detector may be provided at a position where the laser beams reflected from the object are received after the laser beams reflected from the object are re-incident on a reflection surface of the scanning mirror, and the reflection surface of the scanning mirror is configured to reflect the laser beams emitted from the plurality of light sources to the object.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
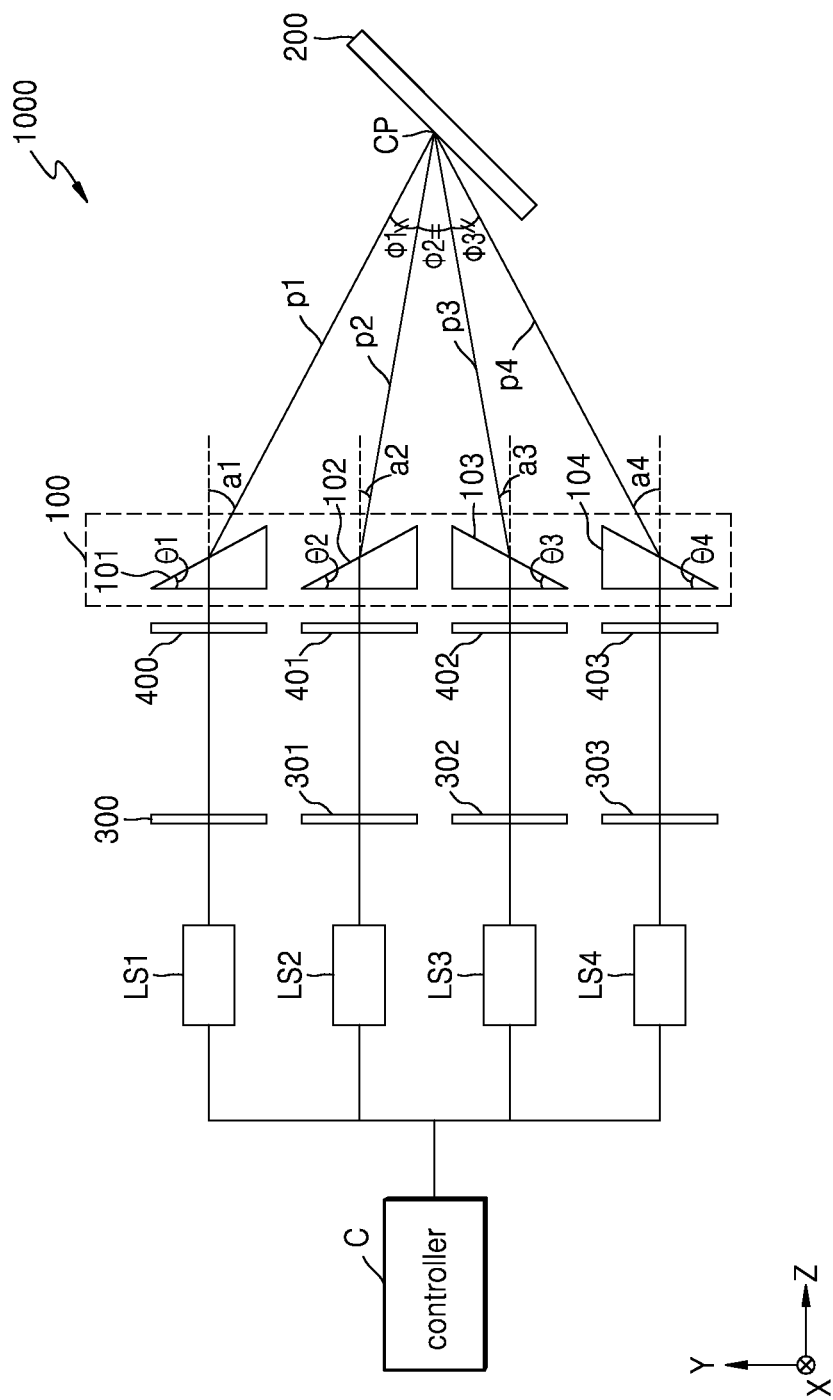
FIG. 1 is a schematic side cross-sectional view showing a configuration of an optical device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, an optical device and a LiDAR system including the same according to various example embodiments will be described in detail with reference to the accompanying drawings. In the drawings, like reference numerals refer to like elements, and the size or thickness of each element may be exaggerated for clarity of explanation.

It will be understood that, although the terms 'first', 'second', etc. may be used herein to describe various elements, these elements should not be limited by these terms. These terms are only used to distinguish one element from another. An optical device and a LiDAR system including the same may be implemented in various different forms and are not limited to the example embodiments described herein.

It should be understood that, when a part "comprises" or "includes" an element in the specification, unless otherwise defined, it is not excluding other elements but may further include other elements.

Throughout the specification, the directions of an X-axis, a Y-axis, and a Z-axis indicating the orientation denote directions perpendicular to each other.

Figure 2:
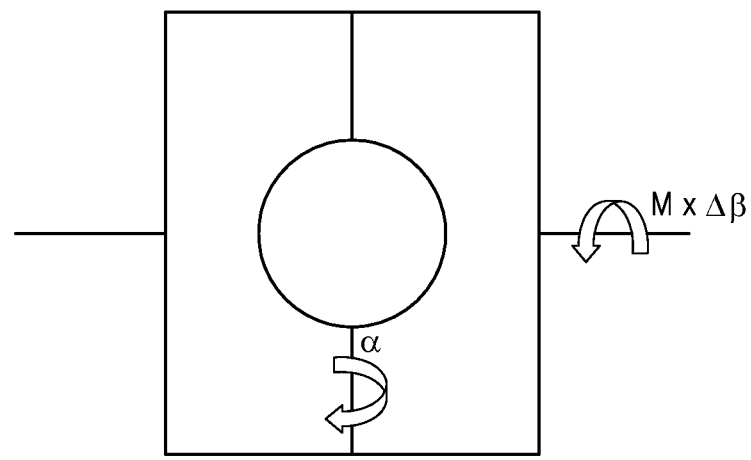
FIG. 2 is a diagram briefly illustrating an example configuration of a scanning mirror of FIG. 1.
Figure 2:
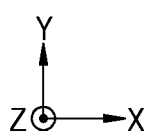
Figure 3:
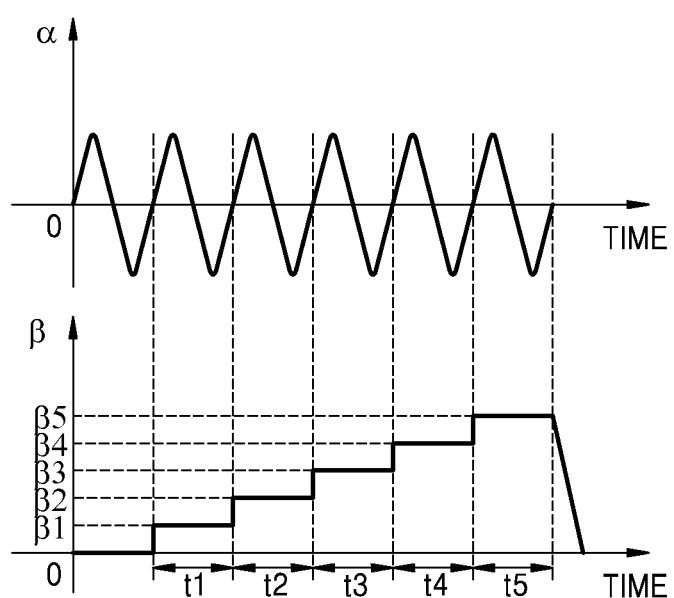
FIG. 3 is a graph briefly explaining an operating principle of the scanning mirror of FIG. 1.
Figure 4:
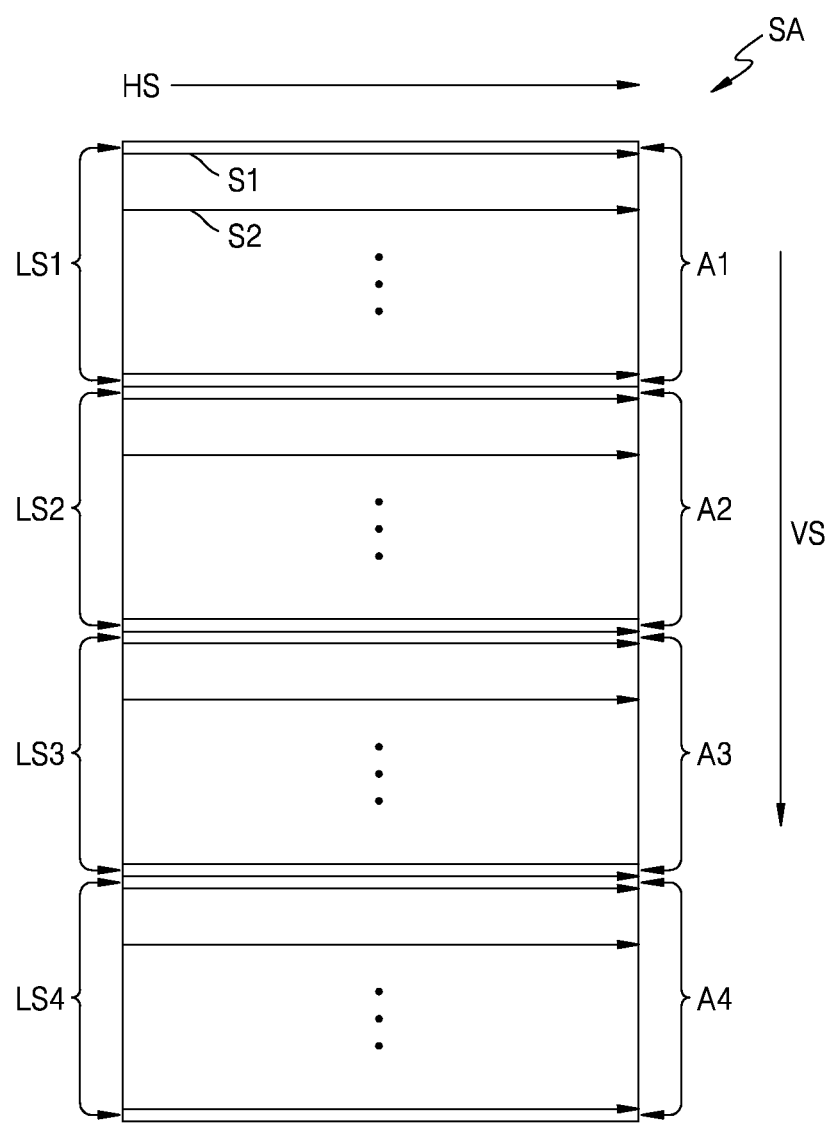
FIG. 4 is a diagram illustrating a scan area formed by the optical device of FIG. 1.
Figure 5:
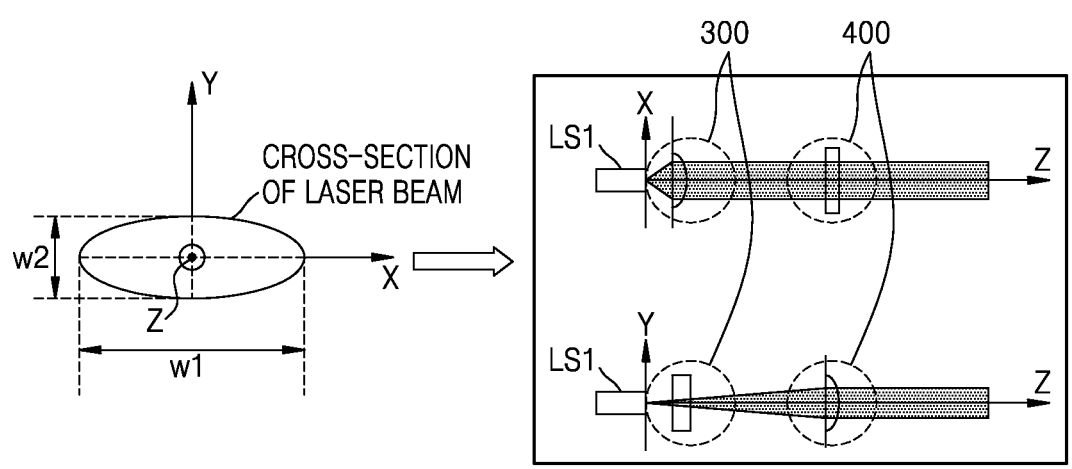
FIG. 5 is a diagram briefly illustrating an example configuration of a first collimator and a second collimator of FIG. 1.

FIG. 1 is a schematic side cross-sectional view showing a configuration of an optical device 1000 according to an example embodiment. FIG. 2 is a diagram briefly illustrating an example configuration of a scanning mirror 200 of FIG. 1. FIG. 3 is a graph briefly explaining an operating principle of the scanning mirror 200 of FIG. 1. FIG. 4 is a diagram illustrating a scan area SA formed by the optical device 1000 of FIG. 1. FIG. 5 is a diagram briefly illustrating example configurations of first collimators 300, 301, 302, and 303 and second collimators 400, 401, 402, and 403 of FIG. 1.

Referring to FIG. 1, the optical device 1000 may include a plurality of light sources LS1, LS2, LS3, and LS4 that emit laser beams, a light direction changing unit 100 including a plurality of prisms 101, 102, 103, and 104 that are provided one by one on travelling paths of the laser beams to form constant angles $\phi1$, $\phi2$, and $\phi3$ between the travelling paths of the laser beams by changing the travelling directions of the laser beams, and thus, to focus the laser beams on one point, and the scanning mirror 200 that performs a two-dimensional (2D) scanning by reflecting laser beams received from the light direction changing unit 100. The light direction changing unit 100 may focus the laser beam to a point CP of the scanning mirror 200. Furthermore, the optical device 1000 may further include the first collimators 300, 301, 302, and 303 that respectively are provided on paths of laser beams between the plurality of light sources LS1, LS2, LS3, and LS4 and the light direction changing unit 100 to reduce spread angles in a first axial direction (for example, an x-axis direction) of the laser beam and the second collimators 400, 401, 402, and 403 that respectively are provided on the paths of the laser beams between the plurality of first collimators 300, 301, 302, and 303 and the light direction changing unit 100 to reduce spread angles in a second axial direction (for example, a y-axis direction) of the laser beam. The second axial direction is different from the first axial direction.

The plurality of light sources LS1, LS2, LS3, and LS4 may be laser diodes that emit laser beams. However, the present embodiment is not limited thereto, and the plurality of light sources LS1, LS2, LS3, and LS4 may be another light source emitting a beam other than the laser beam. The plurality of light sources LS1, LS2, LS3, and LS4 may be spaced apart in a vertical direction (for example, the y-axis direction) so that traveling paths of laser beams to be emitted are parallel to each other in a horizontal direction (for example, a z-axis direction). Furthermore, the plurality of light sources LS1, LS2, LS3, and LS4 may be arranged at equal intervals in the vertical direction (for example, the y-axis direction). Although four light sources LS1, LS2, LS3, and LS4 are depicted in FIG. 1, the present embodiment is not limited thereto, and the optical device 1000 may include more than four light sources.

The light direction changing unit 100 may include a plurality of prisms 101, 102, 103, and 104 respectively provided on traveling paths of the laser beams emitted from the plurality of light sources LS1, LS2, LS3, and LS4. The plurality of prisms, that is, first through fourth prisms 101, 102, 103, and 104 may be wedge prisms having an exit surface inclined with respect to a travelling direction of a laser beam. Accordingly, the traveling direction of the laser beam from the first light source LS1 may be changed by the first prism 101. The traveling direction of the laser beam from the second light source LS2 may be changed by the second prism 102. The traveling direction of the laser beam from the third light source LS3 may be changed by the third prism 103. The traveling direction of the laser beam from the fourth light source LS4 may be changed by the fourth prism 104.

Among the plurality of prisms 101, 102, 103, and 104, two prisms provided at positions symmetrical with respect to the center of the light direction changing unit 100 may have an exit surface having the same inclination angle with each other. For example, the first prism 101 and the fourth prism 104 may be provided at positions symmetrical with respect to the center of the light direction changing unit 100, and an inclination angle $\theta1$ of an exit surface of the first prism 101 may be the same as an inclination angle $\theta4$ of an exit surface of the fourth prism 104. Also, the second prism 102 and the third prism 103 may be provided at positions symmetrical with respect to the center of the light direction changing unit 100. An inclination angle θ2 of an exit surface of the second prism 102 may be the same as an inclination angle θ3 of an exit surface of the third prism 103. Furthermore, among the plurality of prisms 101, 102, 103, and 104, an inclination angle of an exit surface of a prism disposed relatively far from the center of the light direction changing unit 100 may be greater than an inclination angle of an exit surface of a prism disposed relatively close to the center of the light direction changing unit 100. For example, the inclination angle θ1 of the exit surface of the first prism 101 disposed on the outer side relative to the second prism 102 with respect to the center of the light direction changing unit 100 may be greater than the inclination angle θ2 of the exit surface of the second prism 102. Also, the inclination angle θ4 of the exit surface of the fourth prism 104 disposed on the outer side relative to the third prism 103 with respect to the center of the light direction changing unit 100 may be greater than the inclination angle θ3 of the exit surface of the third prism 103. For example, when the refractive indices of the plurality of prisms 101, 102, 103, and 104 are 1.5085, the inclination angles θ1 and θ4 of the exit surfaces of the first and fourth prisms 101 and 104 may be the same at 11.49°, and the inclination angles θ2 and θ3 of the exit surfaces of the second and third prisms 102 and 103 may be the same at 3.92°. In this case, a path of the laser beam changed by the first prism 101 may be bent as much as a first angle a1 from the original traveling path. A path of the laser beam changed by the second prism 102 may be bent as much as the second angle a2 from the original traveling path. A path of the laser beam changed by the third prism 103 may be bent as much as the third angle a3 from the original traveling path. A path of the laser beam modified by the fourth prism 104 may be bent as much as the fourth angle a4 from the original traveling path. The first and fourth angles a1 and a4 may be the same at 6°, and the second and third angles a2 and a3 may be the same at 2°. In this case, an angle φ1 between the first traveling path p1 of the laser beam bent by the first prism 101 and the second traveling path p2 of the laser beam bent by the second prism 102, an angle φ2 between the second traveling path p2 of the laser beam bent by the second prism 102 and the third traveling path p3 of the laser beam bent by the third prism 103, and an angle φ3 between the third traveling path p3 of the laser beam bent by the third prism 103 and the fourth traveling path p4 of the laser beam bent by the fourth prism 104 may all be the same at 4°. A vertical scan area of the optical device 1000 may be formed by laser beams traveling at constant angles φ1, φ2, and φ3.

The scanning mirror 200 may include a rotation mirror capable of rotating in both directions with a first axis and a second axis as the center.

Referring to FIG. 2, for example, the first axis may be in an x-axis direction and the second axis may be in a y-axis direction. Generally, a high speed scanning is performed in the y-axis direction of the second axis. In this case, an angle range of a first direction rotation about the first axis of the scanning mirror 200 is in a range from 0 degrees to M*β (where, M is a natural number and β is an angle), and an angle range of a second directional rotation about the second axis may be in a range from −90 degrees to +90 degrees.

Referring to FIG. 3, the first directional rotation about the first axis may occur in stages. For example, during the time t1, the scanning mirror 200 may maintain a state of rotation by β1 degree in the first direction from the starting point. During the time t2, the scanning mirror 200 may maintain a state of rotation by β2 degree in the first direction from the starting point. During the time t3, the scanning mirror 200 may maintain a state of rotation by β3 degree in the first direction from the starting point. During the time t4, the scanning mirror 200 may maintain a state of rotation by β4 degree in the first direction from the starting point. During the time t5, the scanning mirror 200 may maintain a state of rotation by β5 degree in the first direction from the starting point. In this case, the M value is five. Furthermore, while the first directional rotation about the first axis takes place in stages, the second directional rotation about the second axis may continuously occur. For example, the second direction rotation during the time t1 may occur continuously within the range of −90 degrees to +90 degrees. The vertical scan (VS) area of the optical device 1000 may be formed by a first direction rotation in stages. Also, a horizontal scan (HS) area of the optical device 1000 may be formed by the continuous second direction rotation. The vertical and horizontal scan areas of the optical device 1000 will be described below with reference to FIG. 4.

Referring to FIG. 4, the optical device 1000 may form a first vertical scan area A1 by using the first light source LS1. The optical device 1000 may form a second vertical scan area A2 by using the second light source LS2. The optical device 1000 may form a third vertical scan area A3 by using the third light source LS3. The optical device 1000 may form the fourth vertical scan area A4 by using the fourth light source LS4. In FIG. 4, although four vertical scan areas A1, A2, A3, and A4 are illustrated, the number of vertical scan areas may increase with the increase in the number of light sources. The first vertical scan area A1 may include M vertical channels (M is a natural number). For example, the M vertical channels including a first vertical channel S1 and a second vertical channel S2 included in the vertical scan area A1 respectively may be formed according to the rotation steps of the scanning mirror 200. For example, the first vertical channel S1 may be formed by the scanning mirror 200 that is rotated by β1 degree (refer to FIG. 3) from the starting point. The second vertical channel S2 may be formed by the scanning mirror 200 that is rotated by β2 degree (refer to FIG. 3) from the starting point. In this way, the number of vertical channels of the scan area SA of the optical device 1000 may increase according to the number of light sources and the number of rotation steps of the scanning mirror 200. For example, when the number of light sources is N (N is a natural number), the number of vertical channels of the scan area SA by the optical device 1000 may be N*M.

As described above, a horizontal scan HS may be performed by the second axial rotation of the scanning mirror 200. For example, as the scanning mirror 200 rotates in the second axial direction, a horizontal scan HS may be performed as the change of an incident angle and a reflection angle of a laser beam with respect to a reflection surface of the scanning mirror 200.

The plurality of first collimators 300, 301, 302, and 303 respectively may be provided on the traveling paths of the laser beams between the plurality of light sources LS1, LS2, LS3, and LS4 and the light direction changing unit 100, and thus, the spread angle in the first axial direction (for example, the x-axis direction) may be reduced. The plurality of second collimators 400, 401, 402, and 403 respectively are provided on the traveling paths of the laser beams between the plurality of first collimators 300, 301, 302, and 303 and the light direction changing unit 100, and thus, the spread angle in a second axial direction (for example, the y-axis direction) that is different from the first axial direction of the beam may be reduced.

Referring to FIG. 5, a cross-section of a laser beam may have an elliptical beam shape and a beam width w1 in a first axis direction (for example, the x-axis direction) is greater than a beam width w2 in a second axis direction (for example, the y-axis direction). As the laser beam travels, the beam widths w1 and w2 in the first axis and second axis directions of the laser beam may be gradually increased. In FIG. 5, for convenience of explanation, only one of the plurality of light sources LS1, LS2, LS3, and LS4, one of the plurality of first collimators 300, 301, 302, and 303, one of the plurality of second collimators 400, 401, 402 and 403 are shown as an example.

The first collimator 300 may suppress the increase in the beam width w1 in the first axial direction of the laser beam emitted from the first light source LS1. The first collimator 300 may include a cylindrical lens. For example, the first collimator 300 may include a cylindrical lens having a convex surface shape, such as a semicircle viewing down from the top in the y-axis direction. In addition, the first collimator 300 may include a cylindrical lens having a rectangular shape viewing down from the top in the x-axis direction.

The second collimator 400 may suppress the increase in the beam width w2 in the first axial direction of the laser beam. The second collimator 400 may include a cylindrical lens. For example, the second collimator 400 may include a cylindrical lens having a rectangular shape viewing down from the top in the y-axis direction. In addition, the second collimator 300 may include a cylindrical lens having a convex surface shape, such as a semicircle viewing down from the top in the x-axis direction.

Figure 6:
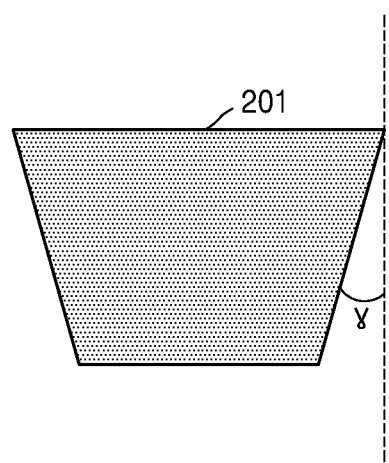
FIG. 6 is a diagram briefly illustrating another example configuration of a scanning mirror of the optical device of FIG. 1.
Figure 7:
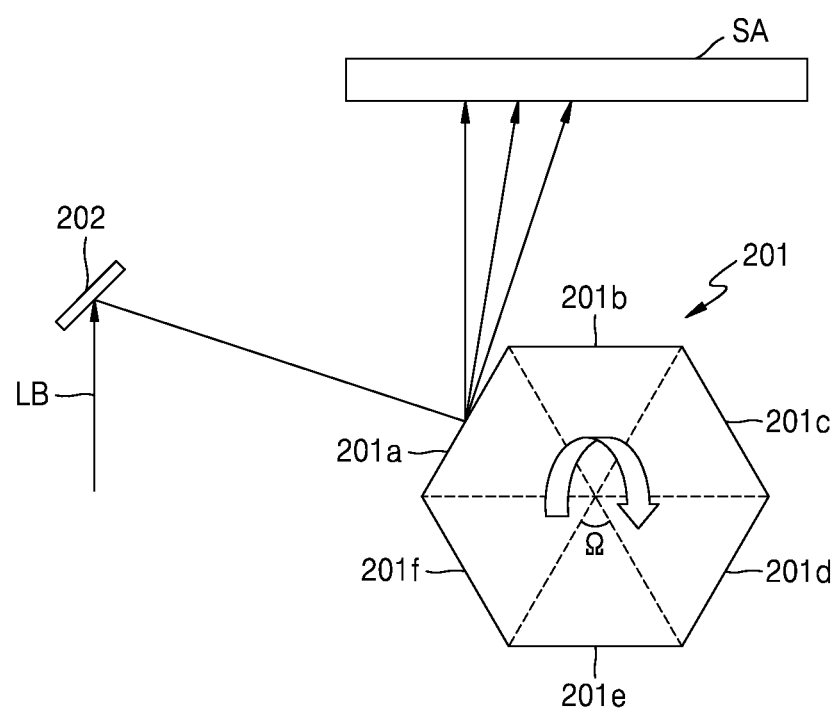
FIG. 7 is a plan view illustrating a simplified configuration of a polygon mirror of FIG. 6.
Figure 8:
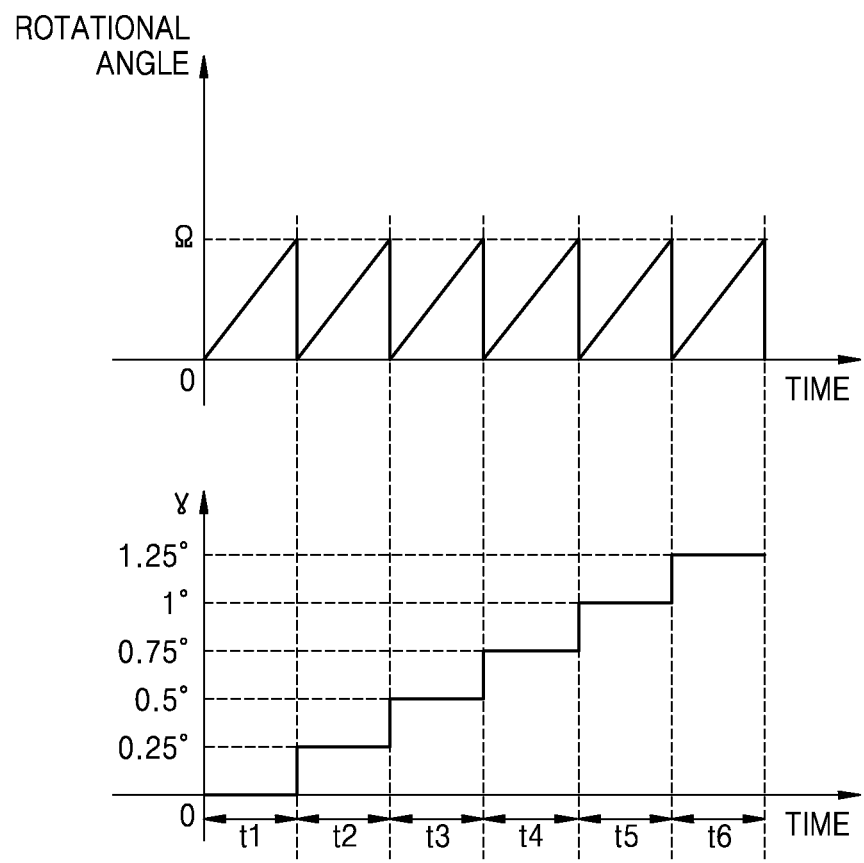
FIG. 8 is a graph briefly illustrating operation characteristics of the polygon mirror of FIG. 6.

FIG. 6 is a diagram briefly illustrating another example configuration of the scanning mirror 200 of the optical device 1000 of FIG. 1. FIG. 7 is a plan view illustrating a simplified configuration of a polygon mirror 201 of FIG. 6. FIG. 8 is a graph briefly illustrating operation characteristics of the polygon mirror 201 of FIG. 6.

Referring to FIG. 6, the scanning mirror 200 of FIG. 1 may include the polygon mirror 201 having M (M is a natural number) reflection surfaces having different inclination angles γ from each other. A laser beam may be reflected in different directions from each other by the M reflection surfaces of the polygon mirror 201, wherein the M reflection surfaces are inclined at different angles with respect to a travelling direction of the laser beam. Accordingly, the vertical scan area of the laser beam may be formed. For example, as described with reference to FIG. 4, when the number of light sources is N, the number of vertical channels of the scan area SA by the optical device 1000 may be N*M.

Referring to FIG. 7, a reflection mirror 202 that reflects a laser beam LB received from the light direction changing unit 100 (refer to FIG. 1) to be directed toward a reflecting surface of the polygon mirror 201 may be provided on a side of the polygon mirror 201. As the polygon mirror 201 rotates, a horizontal scan HS on the scan area SA may be performed. For example, while a first reflection surface 201a of the M reflection surfaces, for example, first to sixth reflection surfaces 201a, 201b, 201c, 201d, 201e, and 201f, rotates by an angle Ω, an incident angle and a reflection angle of a laser beam with respect to the first reflection surface 201a are changed, and thus, the horizontal scan (HS, see FIG. 4) may be performed. The second reflection surface 201b, the third reflection surface 201c, the fourth reflection surface 201d, the fifth reflection surface 201e, and the sixth reflection surface 201f may also rotate by an angle Ω.

Referring to FIG. 8, the time t1 may be a time at which the laser beam is incident on the first reflection surface 201a having the inclination angle γ of 0°. During the time t1, the first reflection surface 201a may rotate by an angle Ω. The time t2 may be a time at which the laser beam is incident on the second reflection surface 201a having the inclination angle γ of 0.25°. During the time t2, the second reflection surface 201b may rotate by an angle Ω. The time t3 may be a time at which the laser beam is incident on the third reflection surface 201c having an inclination angle γ of 0.5°. During the time t3, the third reflection surface 201c may rotate by an angle Ω. The time t4 may be a time at which the laser beam is incident on the fourth reflection surface 201d having the inclination angle γ of 0.75°. During the time t4, the fourth reflection surface 201d may rotate by an angle Ω. The time t5 may be a time at which the laser beam is incident on the fifth reflection surface 201e having the inclination angle γ of 1°. During the time t5, the fifth reflection surface 201e may rotate by an angle Ω. The time t6 may be a time at which the laser beam is incident on the sixth reflection surface 201f having the inclination angle γ of 1.25°. During the time t6, the sixth reflection surface 201f may rotate by an angle Ω.

Figure 9:
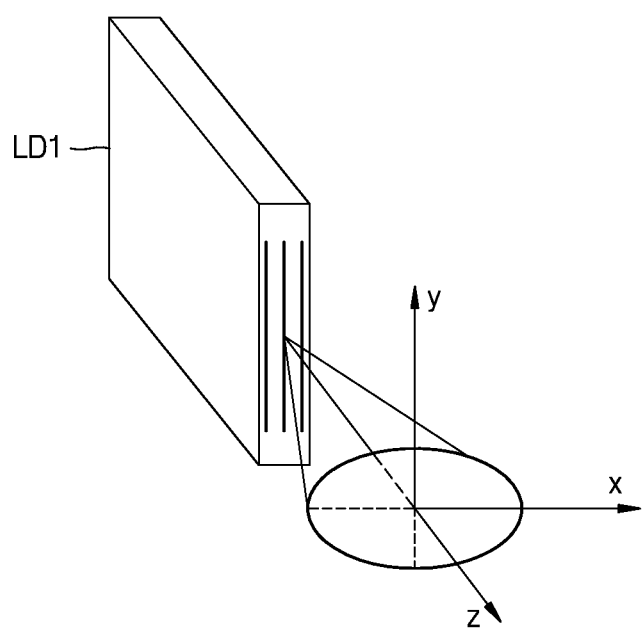
FIG. 9 is a perspective view schematically illustrating an example configuration of a light source that may be applied to the optical device of FIG. 1.
Figure 10:
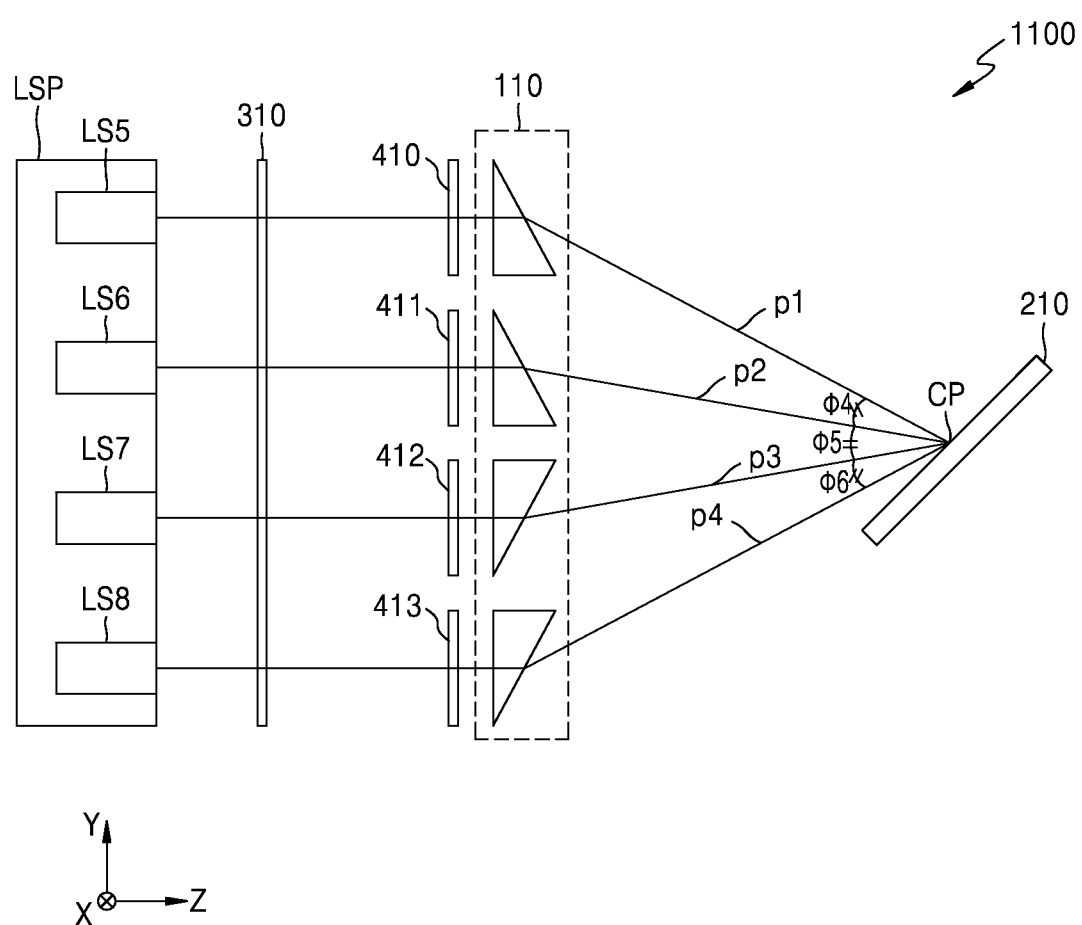
FIG. 10 is a schematic side cross-sectional view showing a configuration of an optical device according to an example embodiment.

FIG. 9 is a perspective view schematically illustrating an example configuration of a light source LD1 that may be applied to the optical device 1000 of FIG. 1. FIG. 10 is a side cross-sectional view schematically illustrating a configuration of an optical device 1100 according to another example embodiment. The optical device 1100 of FIG. 10 may be substantially the same as the optical device 1000 of FIG. 1 except for the light source package LSP and a first collimator 310. In the description of FIG. 10, descriptions already given with reference to FIG. 1 will be omitted.

Referring to FIG. 9, the light source LD1 may be an edge-emitting laser diode. A length in the first axis direction (an x-axis direction) of the light source LD1 may be less than a length in the second axis direction (a y-axis direction). A beam width of a laser beam emitted from the light source LD1 in the first axial direction (the x-axis direction) may be greater than a beam width in the second axial direction (the y-axis direction). When the light source LD1 is applied to the optical device 1000 of FIG. 1, a plurality of light sources LD1 may be formed in the form of a package. A configuration in which the light source LD1 is applied to the optical device 1000 of FIG. 1 will be described below with reference to FIG. 10.

Referring to FIG. 10, the optical device 1100 may include a light source package LSP including a plurality of light sources LS5, LS6, LS7, and LS8 that emit laser beams, a light direction changing unit 110 including a plurality of prisms that are provided one by one on traveling paths of the laser beams to form constant angles φ4, φ5, and φ6 between the travelling paths of the laser beams by changing the travelling directions of the laser beams, and thus, to focus the laser beams on one point, and a scanning mirror 210 that performs two-dimensional scanning by reflecting laser beams transmitted from the light direction changing unit 110. Furthermore, the optical device 1100 may further include a first collimator 310 that is provided on the travelling paths of the laser beams between the light source package LSP and the light direction changing unit 110 to reduce a spread angle in a first axis direction (for example, the x-axis direction) of the laser beam, and a plurality of second collimators 410, 411, 412, and 413 provided one by one on the traveling paths of the laser beams between the first collimator 310 and the light direction changing unit 110 to reduce a spread angle in a second axis direction (for example, the y-axis direction) that is different from the first axis direction of the laser beam.

Each of the plurality of light sources LS5, LS6, LS7, and LS8 included in the light source package LSP may be substantially the same as the light source LD1 of FIG. 9. For example, a beam width in the first axial direction (the x-axis direction) of the laser beams emitted from the light source package LSP may be greater than a beam width in the second axial direction (the y-axis direction).

The first collimator 310 may suppress an increase in the beam width of the laser beams in the first axial direction (the x-axis direction). The first collimator 310 may include a cylindrical lens. In particular, the first collimator 310 may include a cylindrical lens having a convex surface shape, such as a semicircle as viewed down from the top in the y-axis direction. In addition, the first collimator 310 may include a cylindrical lens having a rectangular shape as viewed down from the top in the x-axis direction. The first collimator 310 may be integrally formed. For example, the laser beams emitted from the plurality of light sources LS5, LS6, LS7, and LS8 may all pass through the one first collimator 310.

Figure 11:
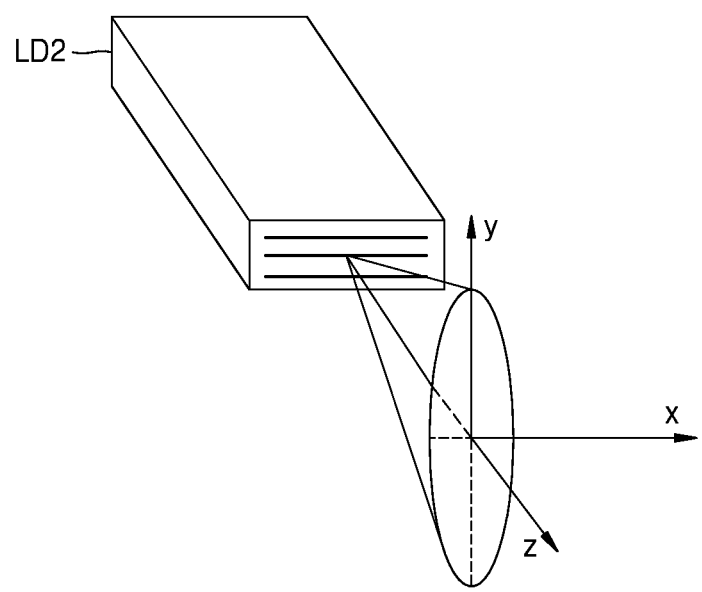
FIG. 11 is a schematic perspective view illustrating an example configuration of a light source that may be applied to the optical device of FIG. 1.
Figure 12:
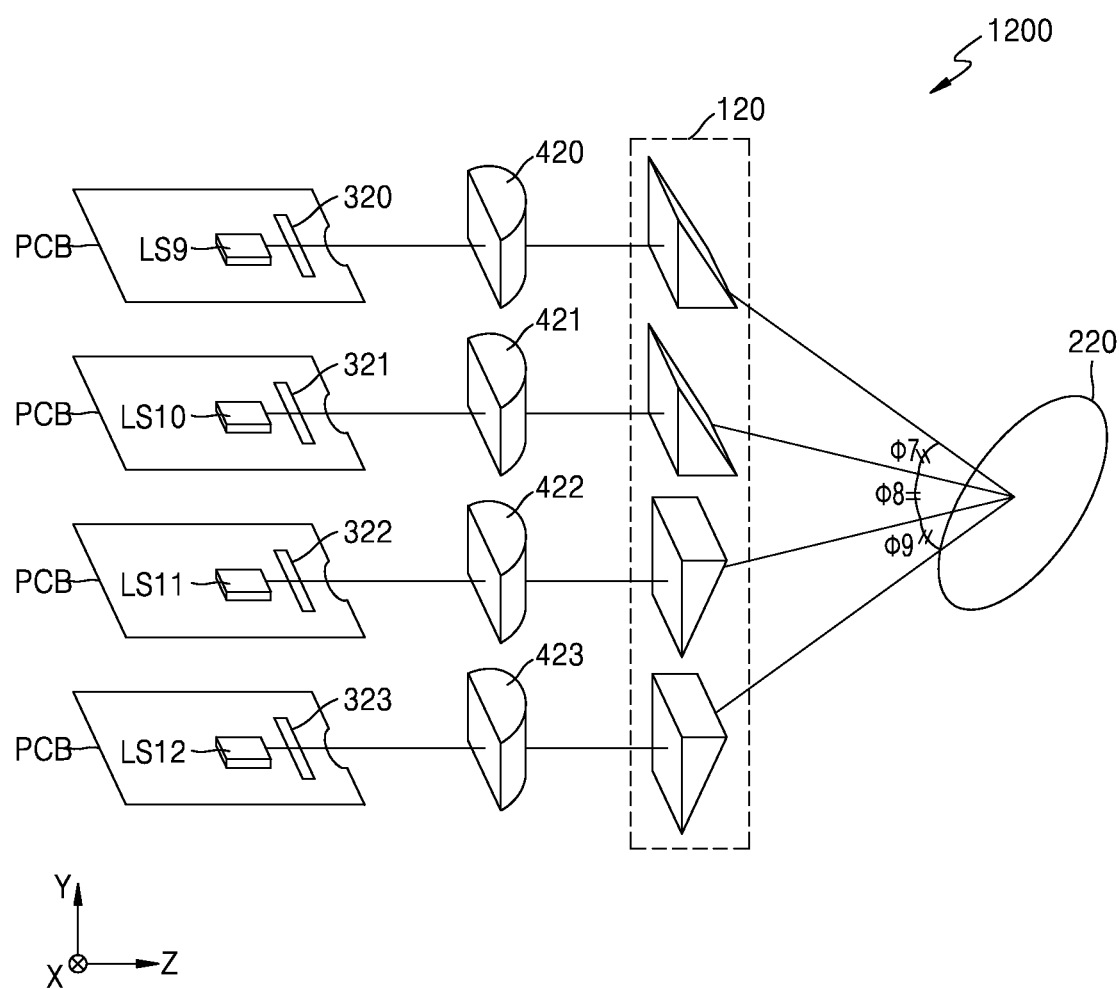
FIG. 12 is a schematic side cross-sectional view showing a configuration of an optical device according to another example embodiment.

FIG. 11 is a perspective view schematically illustrating an example configuration of a light source LD2 that may be applied to the optical device 1000 of FIG. 1. FIG. 12 is a schematic side cross-sectional view illustrating a configuration of an optical device 1200 according to another example embodiment. The optical device 1200 of FIG. 12 is substantially the same as the optical device 1000 of FIG. 1 except for a plurality of light sources LS9, LS10, LS11, and LS12 and a plurality of first collimators 320, 321, 322, and 323 and a plurality of second collimators 420, 421, 422, and 423. In the description of FIG. 12, descriptions already given with reference to FIG. 1 will be omitted.

Referring to FIG. 11, the light source LD2 may include a side-emitting laser diode. A length of the light source LD2 in the first axial direction (the x-axis direction) may be greater than a length in the second axial direction (the y-axis direction). A beam width of a laser beam emitted from the light source LD2 in the first axial direction (the x-axis direction) may be less than a beam width in the second axial direction (the y-axis direction). When the light source LD2 is applied to the optical device 1000 of FIG. 1, the light source LD2 may be provided on the printed circuit board PCB in the form of a chip. A configuration in which the light source LD2 is applied to the optical device 1000 of FIG. 1 will be described below with reference to FIG. 12.

Referring to FIG. 12, the optical device 1200 may include a plurality of light sources LS9, LS10, LS11, and LS12 that emit laser beams, a light direction changing unit 120 including a plurality of prisms that are provided one by one on travelling paths of the laser beams to form constant angles ϕ7, ϕ8, and ϕ9 between the travelling paths of the laser beams by changing the travelling directions of the laser beams, and thus, to focus the laser beams on a point, and a scanning mirror 220 which reflects the laser beam received from the light direction changing unit 120 to perform two-dimensional scanning. Furthermore, the optical device 1200 may further include a plurality of first collimators 320, 321, 322, and 323 that are provided one by one on the travelling paths of the laser beams between the plurality of light sources LS9, LS10, LS11, and LS12 and the light direction changing unit 120 to reduce a spread angle of the laser beams in the second axial direction of the laser beam (for example, the y-axis direction), and a plurality of second collimators 420, 421, 422, and 423 that are provided one by one on the travelling paths of the laser beams between the plurality of first collimators 320, 321, 322, and 323 and the light direction changing unit 120 to reduce a spread angle in the first axis direction (for example, the x-axis direction) that is different from the second axis direction of the laser beams.

Each of the plurality of light sources LS9, LS10, LS11, and LS12 may be the same as the light source LD2 of FIG. 11. For example, a beam width in the first axial direction (the x-axis direction) of the laser beams emitted from the plurality of light sources LS9, LS10, LS11, and LS12 may be less than a beam width in the second axial direction (the y-axis direction). Each of the plurality of light sources LS9, LS10, LS11, and LS12 may be provided on a printed circuit board PCB. Accordingly, the total length of the optical device 1200 in the y-axis direction may be less than the total length of the optical device 1000 in the y-axis direction of FIG. 1.

Each of the plurality of first collimators 320, 321, 322, and 323 may suppress the increase in the beam width of the laser beam in a second axis direction (the y-axis direction). Each of the plurality of first collimators 320, 321, 322, and 323 may include a cylindrical lens. In particular, each of the plurality of first collimators 320, 321, 322, and 323 may include a cylindrical lens having a convex surface shape, such as a semicircle as viewed down from the top in the x-axis direction. In addition, each of the plurality of first collimators 320, 321, 322, and 323 may include a cylindrical lens having a rectangular shape as viewed down from the top in the y-axis direction. Each of the plurality of first collimators 320, 321, 322, and 323 may be provided on a printed circuit board PCB together with each of the plurality of light sources LS9, LS10, LS11, and LS12.

Each of the plurality of second collimators 420, 421, 422, and 423 may suppress the increase in the beam width of the laser beam in a first axis direction (the x-axis direction).

Each of the plurality of second collimators 420, 421, 422, and 423 may include a cylindrical lens.

In particular, each of the plurality of second collimators 420, 421, 422, and 423 may include a cylindrical lens having a convex surface shape, such as a semicircle as viewed down from the top in the y-axis direction.

In addition, each of the plurality of second collimators 420, 421, 422, and 423 may include a cylindrical lens having a rectangular shape as viewed down from the top in the x-axis direction.

Figure 13:
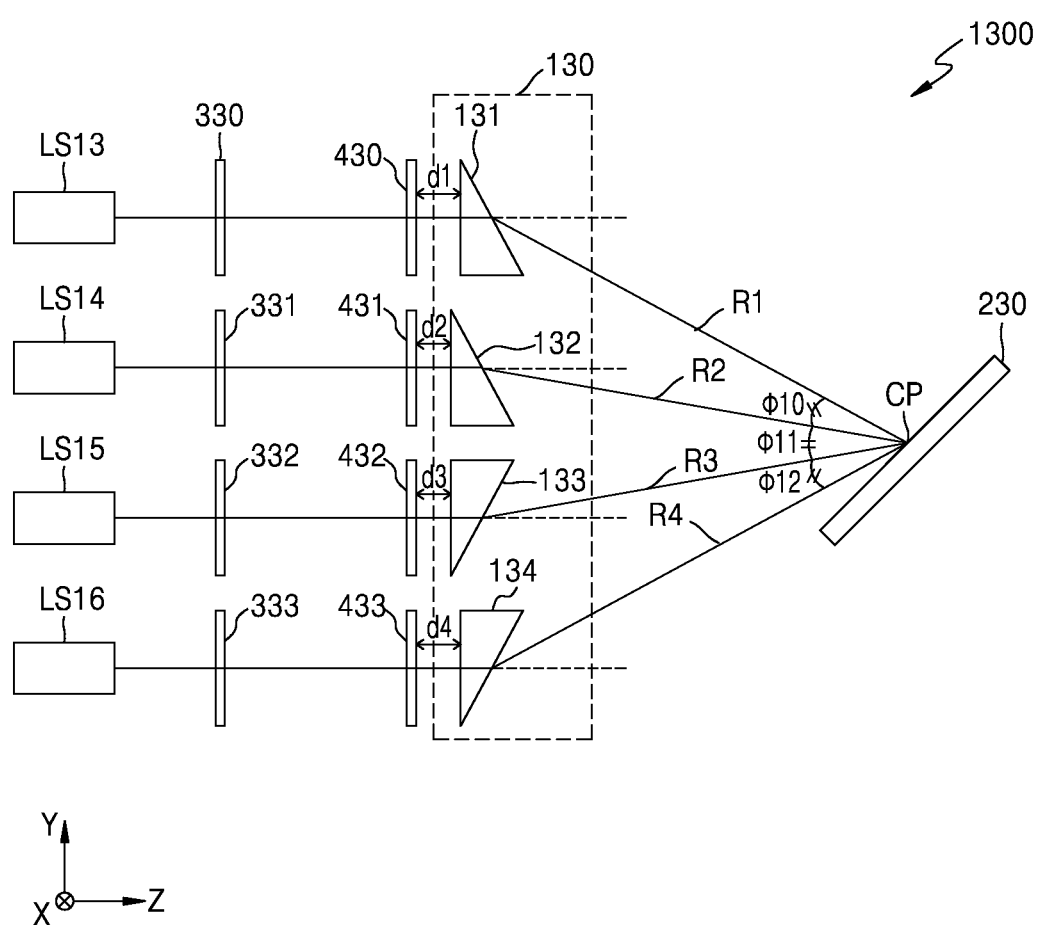
FIG. 13 is a schematic side cross-sectional view showing a configuration of an optical device according to another example embodiment.

FIG. 13 is a schematic side cross-sectional view showing a configuration of an optical device 1300 according to another example embodiment. The optical device 1300 of FIG. 13 may be substantially the same as the optical device 1000 of FIG. 1 except for the light direction changing unit 130. In the description of FIG. 13, descriptions already given with reference to FIG. 1 will be omitted.

Referring to FIG. 13, the optical device 1300 may include a plurality of light sources LS13, LS14, LS15, and LS16 that emit laser beams, a light direction changing unit 130 including a plurality of prisms 131, 132, 133, and 134 that are provided one by one on travelling paths of the laser beams to form constant angles ϕ10, ϕ11, and ϕ12 between the travelling paths of the laser beams by changing the travelling directions of the laser beams, and thus, to focus the laser beams on one point, and a scanning mirror 230 that performs a 2D scanning by reflecting the laser beam received from the light direction changing unit 130. The light direction changing unit 130 may focus the laser beams to a point CP of the scanning mirror 230. Furthermore, the optical device 1300 may further include a plurality of first collimators 330, 331, 332, and 333 that are provided on the travelling paths of the laser beams between the plurality of light sources LS13, LS14, LS15, and LS16 and the light direction changing unit 130 to reduce a spread angle in a first axis direction (for example, the x-axis direction) of the laser beam, and a plurality of second collimators 430, 431, 432, and 433 provided one by one on the traveling paths of the laser beams between the plurality of first collimators 330, 331, 332, and 333 and the light direction changing unit 130 to reduce a spread angle in a second axis direction (for example, the y-axis direction) of the laser beam. The second axis direction is different from the first axis direction.

The light direction changing unit 130 may include a plurality of prisms 131, 132, 133, and 134 respectively provided on the paths of the laser beams emitted from the plurality of light sources LS13, LS14, LS15, and LS16. The plurality of prisms 131, 132, 133, and 134 may include wedge prisms having an exit surface inclined with respect to the travelling direction of the laser beams. Among the plurality of prisms, for example, first through fourth prisms 131, 132, 133, and 134, a distance between a prism that is disposed relatively on an outer side with respect to the center of the light direction changing unit 130 and the second collimator adjacent to the prism may be greater than a distance between a prism that is disposed relatively on an inner side with respect to the center of the light direction changing unit 130 and the second collimator adjacent thereto. For example, a distance d1 between the first prism 131 that is disposed relatively outside the second prism 132 with respect to the center of the light direction changing unit 130 and the second collimator 430 adjacent to the first prism 131 may be greater than a distance d2 between the second prism 132 and the second collimator 431 adjacent to the second prism 132. Also, a distance d4 between the fourth prism 134 disposed relatively outside the third prism 133 with respect to the center of the light direction changing unit 130 and the second collimator 433 adjacent to the fourth prism 134 may be greater than a distance d3 between the third prism 133 and the second collimator 433 adjacent to the third prism 133. Accordingly, the plurality of prisms 131, 132, 133, and 134 may be arranged so that distances between the respective prisms 131, 132, 133, and 134 and one point on which the laser beams are focused are equal. For example, the plurality of prisms 131, 132, 133, and 134 may be arranged so that distances R1, R2, R3, and R4 between each prism 131, 132, 133, and 134 and a point CP of the scanning mirror 230 on which the laser beams are focused may all be arranged to be the same.

Figure 14:
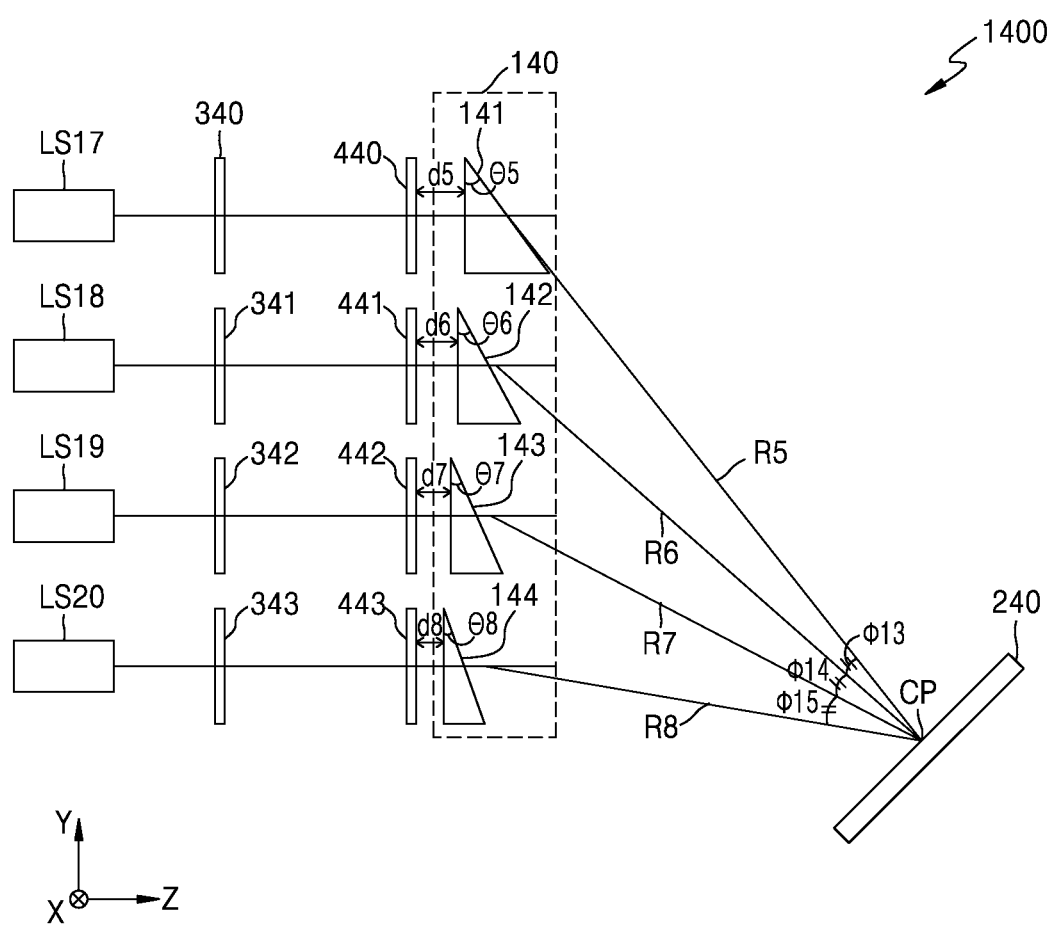
FIG. 14 is a schematic side cross-sectional view showing a configuration of an optical device according to another example embodiment.

FIG. 14 is a schematic side cross-sectional view showing the configuration of an optical device 1400 according to another example embodiment. The optical device 1400 of FIG. 14 may be substantially the same as the optical device 1000 of FIG. 1 except for the light direction changing unit 140. In the description of FIG. 14, descriptions already given with reference to FIG. 1 will be omitted.

Referring to FIG. 14, the optical device 1400 may include a plurality of light sources LS17, LS18, LS19, and LS20 that emit laser beams, the light direction changing unit 140 including a plurality of prisms 141, 142, 143, and 144 that are provided one by one on travelling paths of the laser beams to form constant angles $\phi 13$, $\phi 14$, and $\phi 15$ between the travelling paths of the laser beams by changing the travelling directions of the laser beams, and thus, to focus the laser beams on one point, and a scanning mirror 240 that performs a 2D scanning by reflecting the laser beams received from the light direction changing unit 140. The light direction changing unit 140 may focus the laser beam onto a point CP of the scanning mirror 240. Furthermore, the optical device 1400 may further include a plurality of first collimators 340, 341, 342, and 343 that are provided one by one on the travelling paths of the laser beams between the plurality of light sources LS17, LS18, LS19, and LS20 and the light direction changing unit 140 to reduce a spread angle in the first axis direction (for example, the x-axis direction) of the laser beam, and a plurality of second collimators 440, 441, 442, and 443 provided one by one on the traveling paths of the laser beams between the plurality of first collimators 340, 341, 342, and 343 and the light direction changing unit 140 to reduce a spread angle in the second axis direction (for example, the y-axis direction) of the laser beam. The second axis direction is different from the first axis direction.

The light direction changing unit 140 may include a plurality of prisms 141, 142, 143, and 144 respectively provided on the traveling paths of the laser beams emitted from the plurality of light sources LS17, LS18, LS19, and LS20. The plurality of prisms 141, 142, 143, and 144 may include wedge prisms having an exit surface inclined with respect to the travelling direction of the laser beams. The plurality of prisms 141, 142, 143, and 144 may be arranged so that inclination angles of the exit surfaces of the respective prisms 141, 142, 143, and 144 sequentially increase in the vertical direction (for example, the y-axis direction). For example, the inclination angle $\theta 5$ of the exit surface of the first prism 141 may be greater than the inclination angle $\theta 6$ of the exit surface of the second prism 142 provided below in the vertical direction with respect to the first prism 141. The inclination angle $\theta 6$ of the exit surface of the second prism 142 may be greater than the inclination angle $\theta 7$ of the exit surface of the third prism 143 provided below in the vertical direction with respect to the second prism 142. The inclination angle $\theta 7$ of the exit surface of the third prism 143 may be greater than the inclination angle $\theta 8$ of the exit surface of the fourth prism 144 provided below in the vertical direction with respect to the third prism 143.

The plurality of prisms 141, 142, 143, and 144 may be arranged so that distances between the respective prisms 141, 142, 143, and 144 and one point on which the laser beams are focused are equal. For example, the plurality of prisms 141, 142, 143, and 144 may be arranged so that distances R5, R6, R7, and R8 between each prism 141, 142, 143, and 144 and a point CP of the scanning mirror 240 on which the laser beams are focused may all be the same. At the same time, the plurality of prisms 141, 142, 143, and 144 may be arranged so that a distance between each prism 141, 142, 143, and 144 and the second collimator adjacent to each prism is sequentially increased in the vertical direction. For example, a distance d5 between the first prism 141 and the second collimator 440 adjacent to the first prism 141 may be greater than a distance d6 between the second prism 142 provided below in the vertical direction with respect to the first prism 141 and the second collimator 441. The distance d6 between the second prism 142 and the second collimator 441 adjacent to the second prism 142 may be greater than the distance d7 between the third prism 143 provided below in the vertical direction to the second prism 142 and the second collimator 442 adjacent to the third prism 143. The distance d7 between the third prism 143 and the second collimator 442 adjacent to the third prism 143 may be greater than the distance d8 between the fourth prism 144 provided below in the vertical direction to the third prism 143 and the second collimator 443 adjacent to the fourth prism 144.

Figure 15:
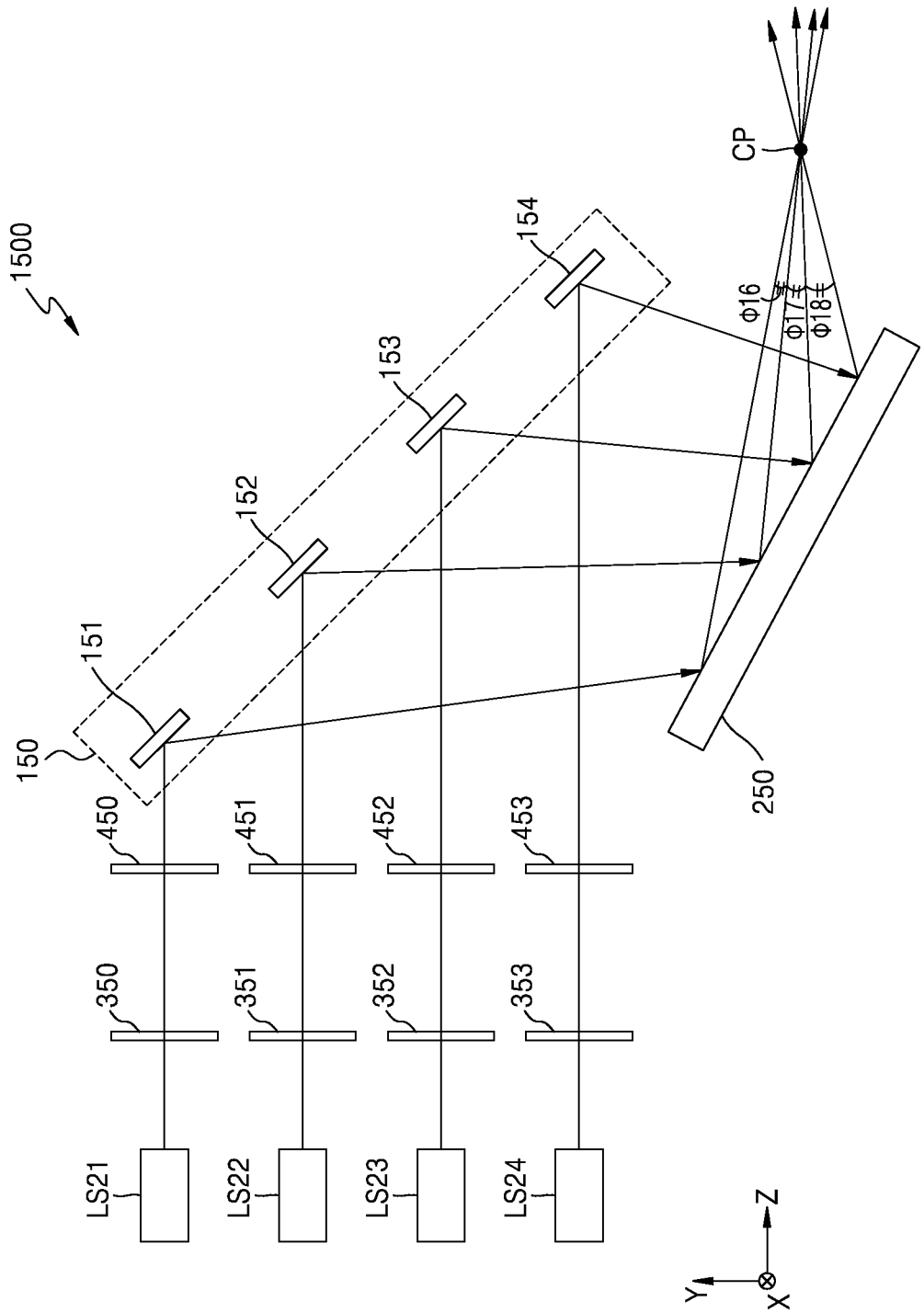
FIG. 15 is a schematic side cross-sectional view showing a configuration of an optical device according to another example embodiment.

FIG. 15 is a schematic side cross-sectional view showing a configuration of an optical device 1500 according to another example embodiment. The optical device 1500 of FIG. 15 may be substantially the same as the optical device 1000 of FIG. 1 except for the light direction changing unit 150. In the description of FIG. 15, descriptions already given with reference to FIG. 1 will be omitted.

Referring to FIG. 15, the optical device 1500 may include a plurality of light sources LS21, LS22, LS23, and LS24 that emit laser beams, the light direction changing unit 150 including a plurality of mirrors 151, 152, 153, and 154 that are provided one by one on travelling paths of the laser beams to form constant angles $\phi16$, $\phi17$, and $\phi18$ between the travelling paths of the laser beams by changing the travelling directions of the laser beams, and thus, to focus the laser beams on one point, and a scanning mirror 250 that performs a 2D scanning by reflecting the laser beams received from the light direction changing unit 150. The light direction changing unit 150 may change the travelling direction of the laser beams emitted from the plurality of light sources LS21, LS22, LS23, and LS24 so that the laser beams reflected by the scanning mirror 250 are focused on one point CP. In this case, the scanning mirror 250 may be a fixed reflection mirror. Furthermore, the optical device 1500 may further include a plurality of first collimators 350, 351, 352, and 353 that are provided one by one on the travelling paths of the laser beams between the plurality of light sources LS21, LS22, LS23, and LS24 and the light direction changing unit 150 to reduce a spread angle in the first axis direction (for example, the x-axis direction) of the laser beam, and a plurality of second collimators 450, 451, 452, and 453 that are provided one by one on the traveling paths of the laser beams between the plurality of first collimators 350, 351, 352, and 353 and the light direction changing unit 150 to reduce a spread angle in the second axis direction (for example, the y-axis direction) of the laser beam. The second axis direction is different from the first axis direction.

The light direction changing unit 150 may include a plurality of mirrors 151, 152, 153, and 154. The plurality of mirrors 151, 152, 153, and 154 may be provided on traveling paths of the laser beams emitted from the plurality of light sources LS17, LS18, LS19, and LS20, respectively. The plurality of mirrors 151, 152, 153, and 154 may have reflection surfaces that are inclined with respect to the traveling direction of the laser beams.

Figure 16:
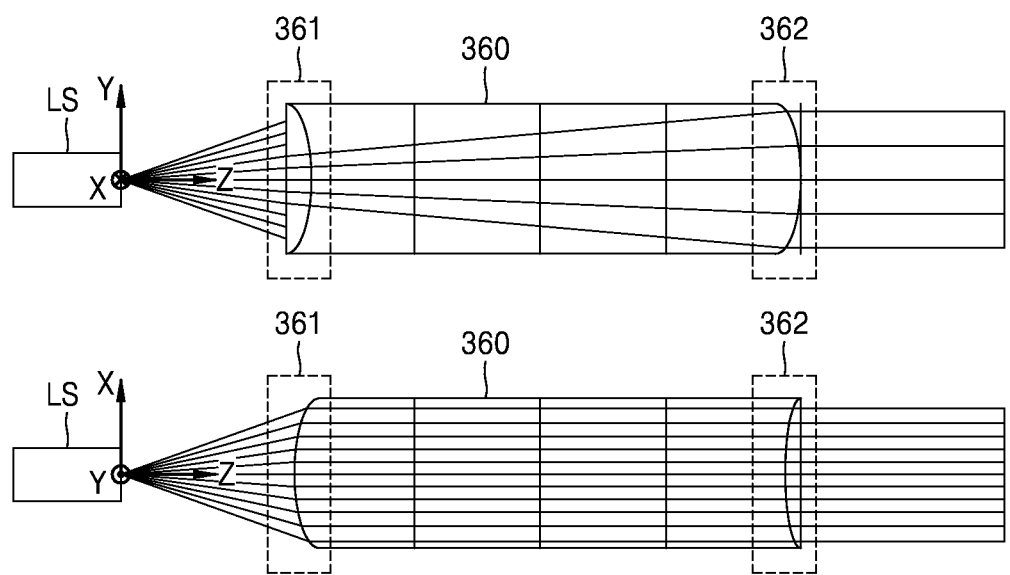
FIG. 16 is a schematic diagram briefly illustrating an example configuration of a collimator that may be applied to the optical device of FIG. 1.

FIG. 16 is a schematic diagram briefly illustrating an example configuration of a collimator 360 that may be applied to the optical device 100 of FIG. 1.

Referring to FIG. 16, the collimator 360 may be integrally formed. For example, the configuration of the collimator 360 of FIG. 16 may be substantially the same as a configuration in which any one of the plurality of first collimators 300, 301, 302, and 303 of FIG. 1, for example, the first collimator 300 and any one of the plurality of second collimators 400, 401, 402, and 403, for example, the second collimator 400 are integrally formed.

For example, the collimator 360 may include a first portion 361 at one end close to a light source LS and a second portion 362 at the other end far from the light source LS. The first portion 361 of the collimator 360 may include a lens shape having a convex surface toward an outside of the collimator 360 as viewed down from the top in the y-axis direction and having a concave surface toward an inside of the collimator 360 as viewed down from the top in the x-axis direction. Also, the second portion 362 of the collimator 360 may include a lens shape having a concave surface toward the inside of the collimator 360 as viewed down from the top in the y-axis direction and having a convex surface toward the outside of the collimator 360 as viewed down from the top in the x-axis direction.

The collimator 360 may reduce a spread angle in the first axial direction (for example, the x-axis direction) of the laser beam emitted from the light source LS. In addition, the collimator 360 may reduce the spread angle in the second axis direction (for example, the y-axis direction) of the laser beam emitted from the light source LS. For example, the first portion 361 of the collimator 360 may reduce the spread angle in the first axial direction (for example, the x-axis direction) of the laser beam, and the second portion 362 of the collimator 360 may reduce the spread angle in the second axial direction (for example, the y-axis direction) of the laser beam.

Figure 17:
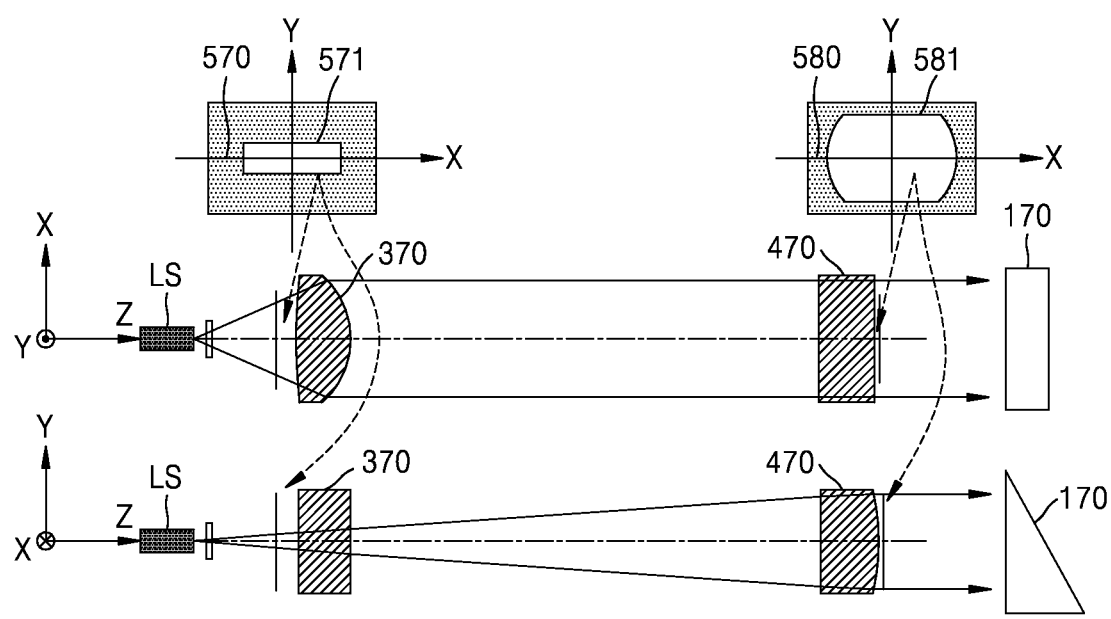
FIG. 17 is a diagram briefly illustrating an example configuration of a first aperture and a second aperture that may be applied to the optical device of FIG. 1.

FIG. 17 is a diagram briefly illustrating an example configuration of a first aperture 570 and a second aperture 580 that may be applied to the optical device 1000 of FIG. 1.

Referring to FIG. 17, the first aperture 570 may be provided between a light source LS and a first collimator 370 to suppress divergence of a laser beam. The first aperture 570 may include an opening 571 having a shape in which a length in the first direction (the x-axis direction) is greater than a length in the second direction (the y-axis direction). The second aperture 580 may be provided between a second collimator 470 and a light direction changing unit 170 to suppress divergence of the laser beam. The second aperture 580 may include an opening 581 having a shape in which a length in the first direction (the x-axis direction) is greater than a length in the second direction (the y-axis direction).

The first and second apertures 570 and 580 may block a beam of an outer portion of a cross-section of the laser beam emitted from the light source LS. The beam of the outer portion of the cross-section of the laser beam is light that is not incident to the first collimator 370 or a prism 170, and may be referred to as noise light. The first and second apertures 570 and 580 are structures for blocking noise light, and may improve efficiency and accuracy of the LiDAR system to which the optical device 1000 of FIG. 1 may be applied.

Figure 18:
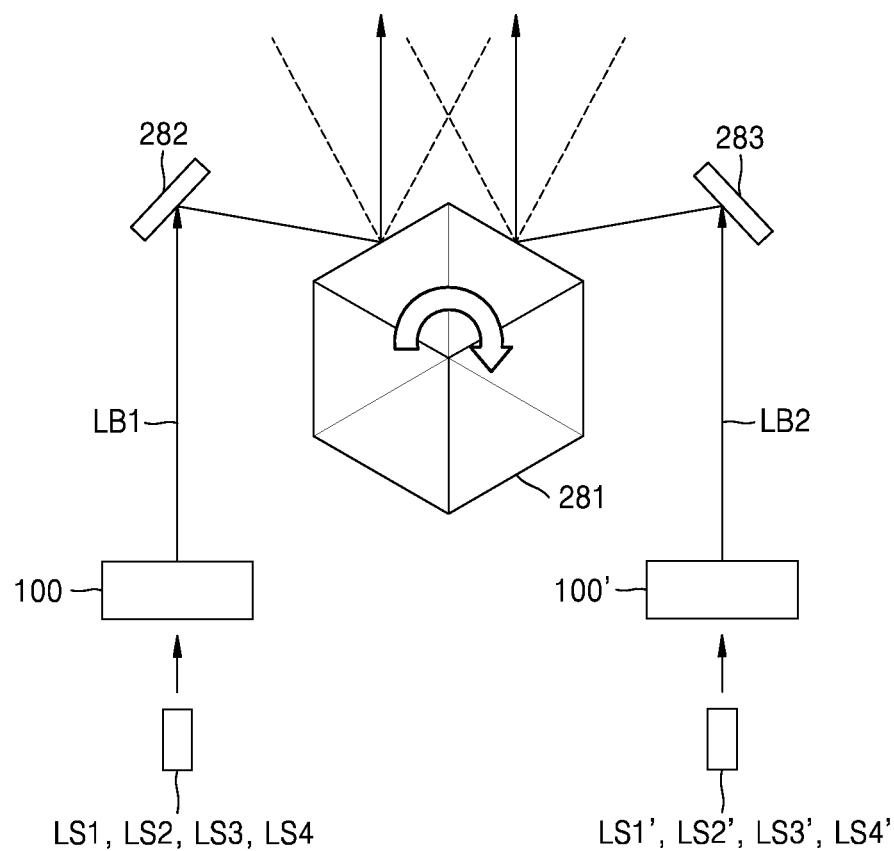
FIG. 18 is a diagram briefly illustrating another example configuration of the scanning mirror of the optical device of FIG. 1.
Figure 19:
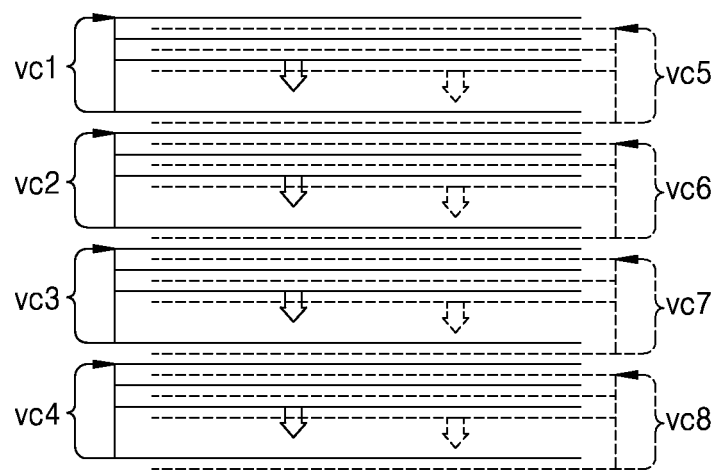
FIG. 19 is a diagram briefly illustrating a scan area by the optical device of FIG. 1, to which the configuration of FIG. 18 is applied.

FIG. 18 is a diagram briefly illustrating another example configuration of the scanning mirror 200 of the optical device 1000 of FIG. 1. FIG. 19 is a diagram briefly illustrating a scan area by the optical device 1000 of FIG. 1 to which the configuration of FIG. 18 is applied. In the description of FIG. 18, descriptions already given with reference to those of FIGS. 6 to 8 will be omitted.

Referring to FIG. 18, the scanning mirror 200 of FIG. 1 may include a polygon mirror 281 having M (M is a natural number) reflection surfaces having different inclination angles. The polygon mirror 281 of FIG. 18 may be substantially the same as the polygon mirror 201 of FIG. 6. The laser beams may be reflected in different directions by M reflection surfaces of the polygon mirror 281 inclined at different angles with respect to the travelling direction of the laser beams. Accordingly, a vertical scan area of the laser beam may be formed. As the polygon mirror 281 rotates, a horizontal scan area of the laser beam may be formed.

A plurality of second light sources LS1', LS2', LS3', and LS4' and a second light direction changing unit 100' may be disposed at positions symmetrical to the plurality of light sources LS1, LS2, LS3, and LS4 and the light direction changing unit 100 with the polygon mirror 281 as the center. On a side of the polygon mirror 281, a first reflection mirror 282 that reflects the laser beam LB1 received from the light direction changing unit 100 (refer to FIG. 1) and directs the laser beam LB1 towards any one reflection surface of the polygon mirror 281 may be provided. Also, a second reflection mirror 283 may further be provided on the other side of the polygon mirror 281 to reflect a laser beam LB2 received from the second light direction changing unit to be directed to the other reflecting surface of the polygon mirror 281.

The first reflection mirror 282 and the second reflection mirror 283 may be disposed to be misaligned from each other so that the number of vertical channels of the optical apparatus 1000 of FIG. 1 increases. Referring to FIG. 19, light emitted from the plurality of light sources LS1, LS2, LS3, and LS4 may enter the first reflection mirror 282 through the light direction changing unit 100. Light emitted from a plurality of second light sources may enter the second reflection mirror 283 through a second light direction changing unit. A plurality of vertical scan areas vc1, vc2, vc3, and vc4 may be formed by the laser beam reflected by the first reflection mirror 282. A plurality of vertical scan regions vc5, vc6, vc7, and vc8 may be formed by the laser beam reflected by the second reflecting mirror 283. A plurality of vertical channels included in the plurality of vertical scan regions vc5, vc6, vc7, and vc8 may be alternately formed between the plurality of vertical channels included in the plurality of vertical scan regions vc1, vc2, vc3, and vc4. In this way, the optical device 1000 may further include the polygon mirror 281, the second light direction changing unit, and the first and second reflection mirrors 282 and 283 disposed to be misaligned from each other. Accordingly, the optical device 1000 may form a scan area of increased resolution according to the increased number of vertical channels.

Figure 20:
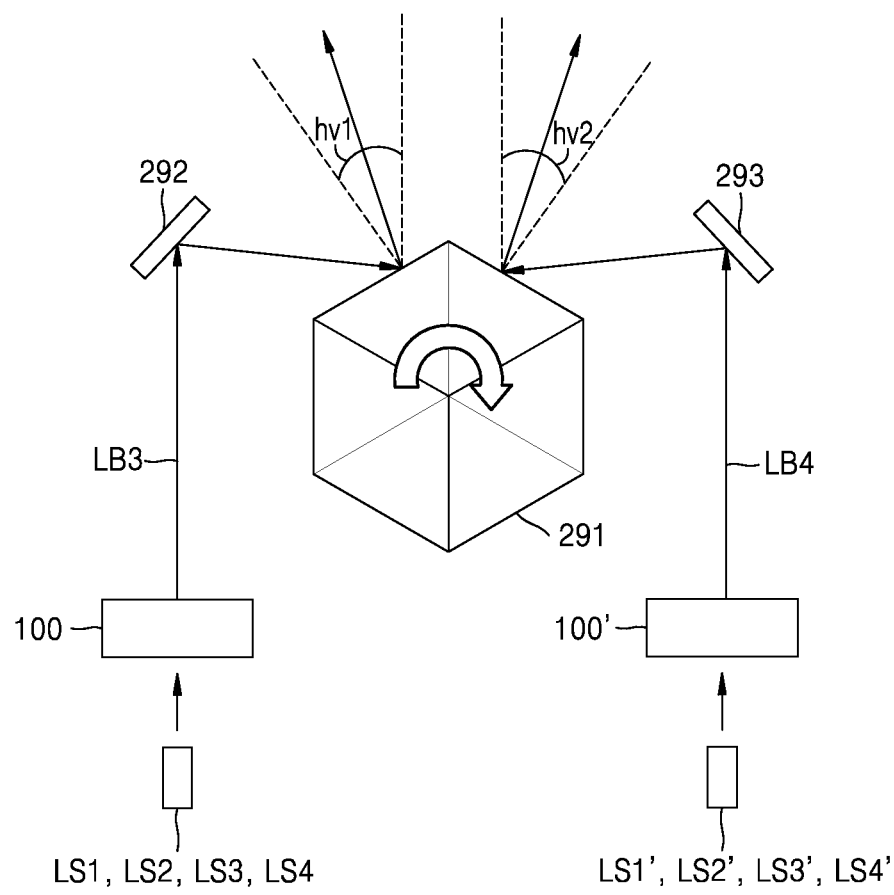
FIG. 20 is a diagram briefly illustrating another example configuration of a scanning mirror of the optical device of FIG. 1.
Figure 21:
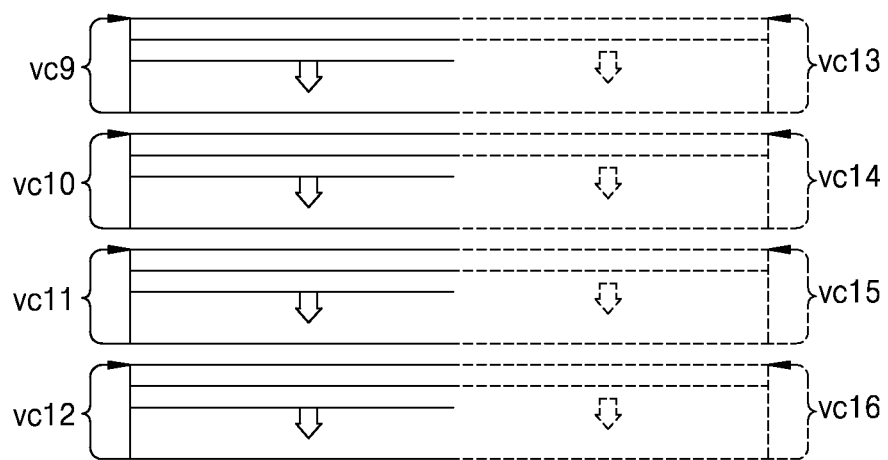
FIG. 21 is a diagram briefly illustrating a scan area by the optical device of FIG. 1, to which the configuration of FIG. 20 is applied.

FIG. 20 is a diagram briefly illustrating another example configuration of the scanning mirror 200 of the optical device 1000 of FIG. 1. FIG. 21 is a diagram briefly illustrating a scan area by the optical device 1000 of FIG. 1 to which the configuration of FIG. 20 is applied. In the description of FIG. 20, descriptions already given with reference to FIGS. 6 through 8 will be omitted.

Referring to FIG. 20, the scanning mirror 200 of FIG. 1 may include a polygon mirror 291 having M (M is a natural number) reflection surfaces having different inclination angles. The polygon mirror 291 of FIG. 20 may be substantially the same as the polygon mirror 201 of FIG. 6. A laser beam may be reflected in different directions by the M reflection surfaces of the polygon mirror 291 inclined at different angles with respect to a travelling direction of the laser beam. Accordingly, a vertical scan area of the laser beam may be formed. As the polygon mirror 291 rotates, a horizontal scan area of the laser beam may be formed.

A plurality of second light sources LS1', LS2', LS3', and LS4' and a second light direction changing unit 100' may be disposed at positions symmetrical with the plurality of light sources LS1, LS2, LS3, and LS4 and the light direction changing unit 100 with the polygon mirror 291 as the center. A first reflection mirror 292 may be provided on a side of the polygon mirror 291 to reflect a laser beam LB3 received from the light direction changing unit 100 (refer to FIG. 1) to be directed to any one reflection surface of the polygon mirror 291. Also, a second reflection mirror 293 may further be provided on the other side of the polygon mirror 291 to reflect a laser beam LB4 received from the second light direction changing unit to be directed to the other reflecting surface of the polygon mirror 291.

The first reflection mirror 292 and the second reflection mirror 293 may be disposed so that a total horizontal viewing angle is increased by separating a horizontal viewing angle hv1 of a laser beam reflected by the first reflection mirror 292 and a horizontal viewing angle hv2 of a laser beam reflected by the second reflection mirror 293. For example, a total horizontal viewing angle of the optical device 1000 may be increased to reduce an area where the horizontal viewing angle hv1 and the horizontal viewing angle hv2 overlap by controlling angles of the first reflection mirror 292 and the second reflection mirror 293. Referring to FIG. 21, an overall horizontal viewing angle of the optical device 1000 may be increased by reducing an overlapping area between a plurality of vertical scan areas vc9, vc10, vc11, and vc12 by a laser beam emitted from the plurality of light sources LS1, LS2, LS3, and LS4 and then reflected by the first reflection mirror 282 after passing through light direction changing unit 100 and a plurality of vertical scan areas vc13, vc14, vc15, and vc16 by a laser beam emitted from a second light source and then reflected by the second reflection mirror 283 after passing through a second light direction changing unit by controlling the angles of the first reflection mirror 292 and the second reflection mirror 293.

Also, the first reflection mirror 292 and the second reflection mirror 293 may be disposed to be misaligned from each other so that the number of vertical channels of the optical device 1000 of FIG. 1 is increased. Accordingly, the resolution of the scan area formed by the optical device 1000 may be increased as described with reference to FIG. 19.

Figure 22:
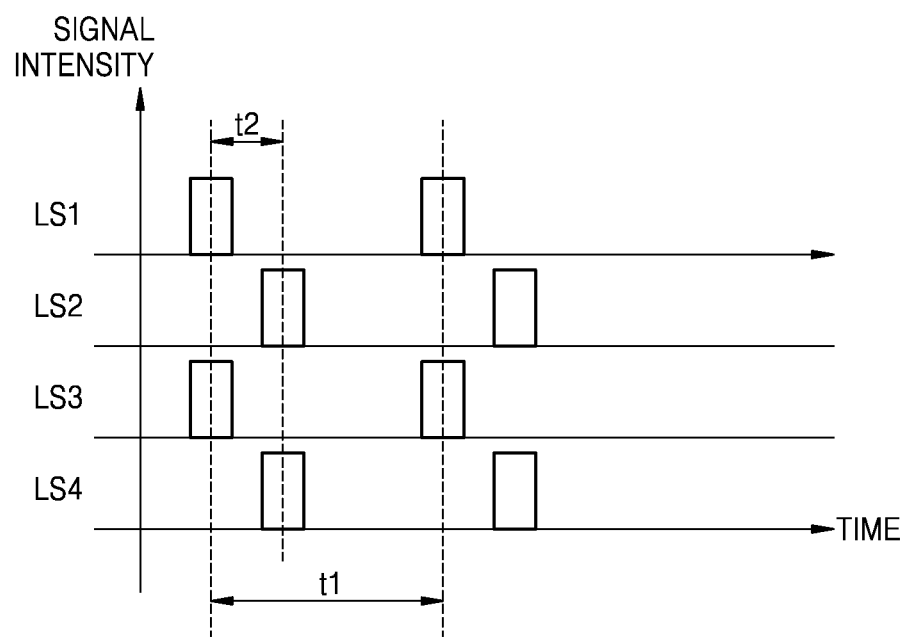
FIG. 22 is a diagram briefly illustrating a method of driving a plurality of light sources of the optical device of FIG. 1.

FIG. 22 is a diagram briefly illustrating a method of driving a plurality of light sources LS1, LS2, LS3, and LS4 of the optical device 1000 of FIG. 1. In describing FIG. 22, reference is made to FIG. 1.

The optical device 1000 of FIG. 1 may further include a controller C that generates a driving signal for driving the plurality of light sources LS1, LS2, LS3, and LS4. The controller may preferentially transmit a driving signal to light sources separated from each other with at least one light source therebetween. For example, the controller may preferentially transmit the driving signal to the first light source LS1 and the third light source LS3 separated in the vertical direction (the y-axis direction) with the second light source LS2 therebetween. In this case, the controller may not transmit the driving signal to the second light source LS2 and the fourth light source LS4. The controller may transmit a driving signal to the second light source LS2 and the fourth light source LS4 that are separated in the vertical direction (the y-axis direction) with the third light source LS3 therebetween after a time t2 has elapsed since the controller transmits a driving signal to the first light source LS1 and the third light source LS3. In this case, the controller may not transmit a driving signal to the first light source LS1 and the third light source LS3. Also, for improved luminous efficiency, a secondary driving for each of the light sources LS1, LS2, LS3, and LS4 may be performed after a time t1 has elapsed since a primary driving is completed. The time t1 may be equal to or greater than a waiting time needed for emitting light for each light source LS1, LS2, LS3, LS4. In this case, the time interval t1 between the primary driving and the secondary driving of each of the light sources LS1, LS2, LS3, and LS4 is greater than the time interval t2 between the driving of the first and third light sources LS1 and LS3 and the driving of the second and fourth light sources LS2 and LS4.

Figure 23:
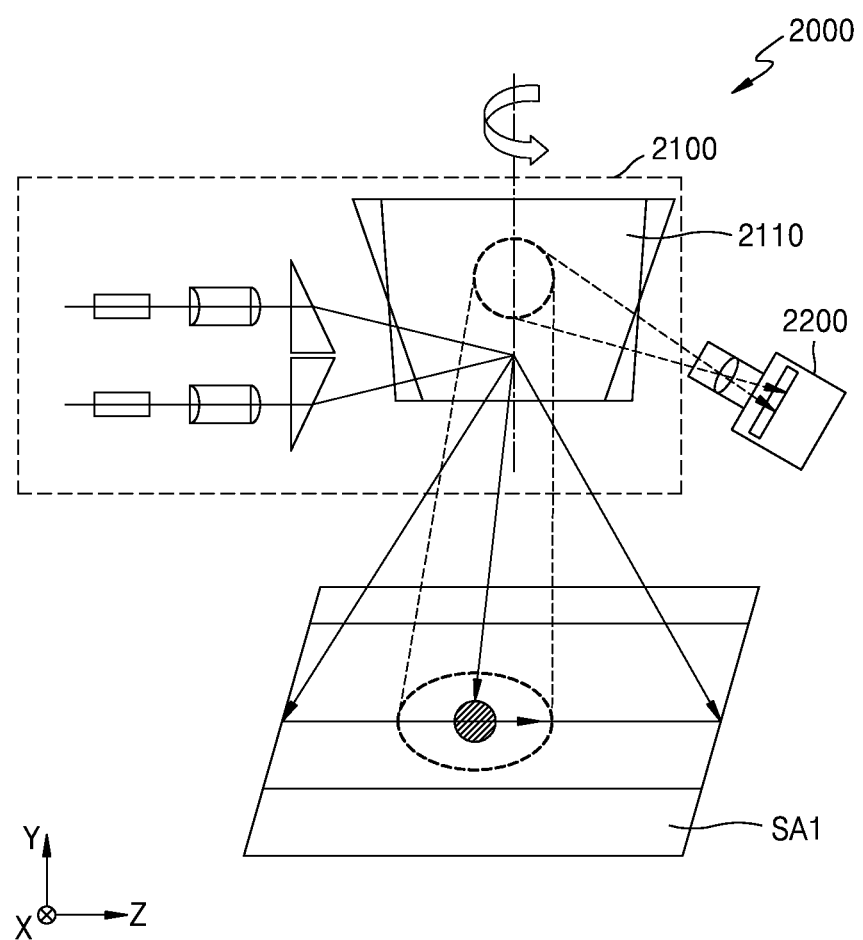
FIG. 23 is a schematic diagram illustrating a configuration of a LiDAR system according to an example embodiment.

FIG. 23 is a schematic diagram illustrating a configuration of a LiDAR system 2000 according to an example embodiment.

Referring to FIG. 23, the LiDAR system 2000 may include an optical device 2100 for scanning light onto an object and a detector 2200 for receiving light reflected from the object.

The optical device 2100 may include any one of the optical devices 1000, 1100, 1200, 1300, 1400, and 1500 described with reference to FIGS. 1 through 22. The optical device 2100 may form a scan area SA1 by emitting a laser beam to toward the object.

The detector 2200 may be provided at a position where, after light reflected from the object is re-incident on a reflection surface of a scanning mirror 2110, the light re-reflected by the reflection surface is received. The reflection surface of the scanning mirror 2110 to which the light is re-incident after the light is reflected from the object may be the same as the reflection surface that reflects a laser beam to the object. The detector 2200 may include a high sensitivity avalanche photodiode (APD), a single-photon avalanche diode (SPAD), a silicon photomultiplier (SiPM), or the like. Also, the detector 2200 may further include a time digital counter (TDC) for measuring a flight time of a laser beam. Since the LiDAR system 2000 includes a structure in which light emission by the light scanner and light reception by the detector 2200 are made through the same reflection surface of the scanning mirror 2110, when the LiDAR system 2000 is used, a horizontal viewing angle may be increased, and thus, light receiving efficiency may be increased.

Figure 24:
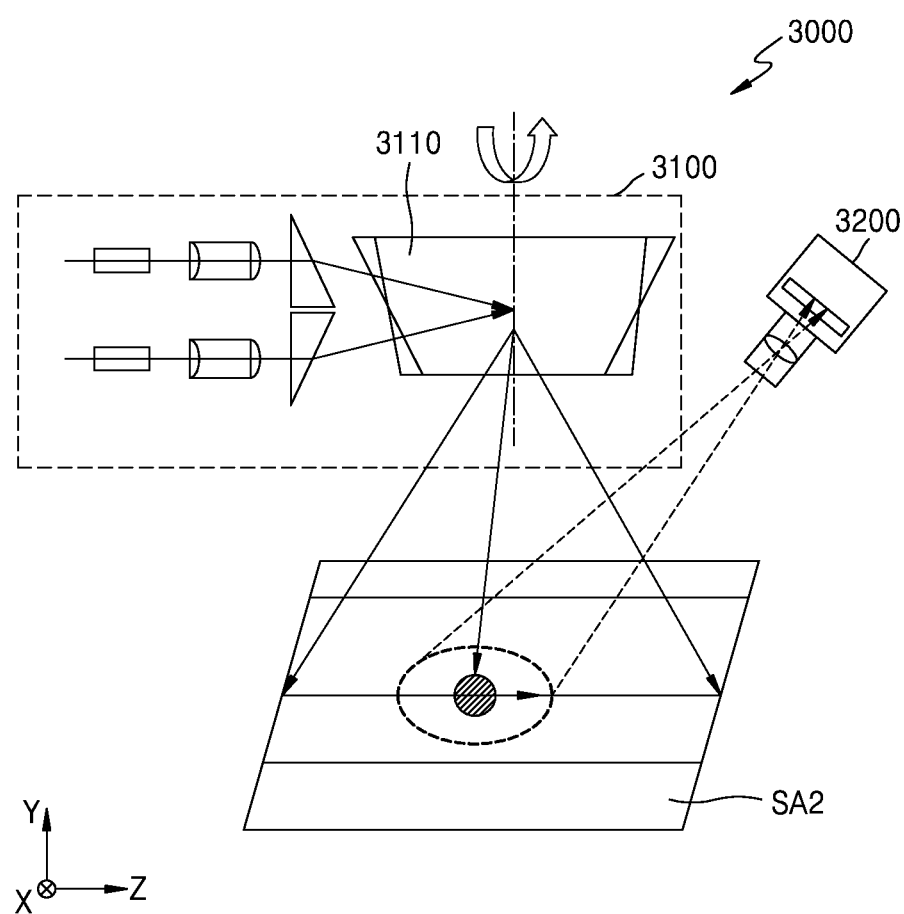
FIG. 24 is a schematic diagram illustrating a configuration of a LiDAR system according to another example embodiment.

FIG. 24 is a schematic diagram illustrating a configuration of a LiDAR system 3000 according to another example embodiment.

Referring to FIG. 24, the LiDAR system 3000 may include an optical device 3100 for scanning light onto an object and a detector 3200 for receiving light reflected from the object.

The optical device 3100 may include any one of the optical devices 1000, 1100, 1200, 1300, 1400, and 1500 described with reference to FIGS. 1 through 22. The optical device 3000 may form a scan area SA2 by emitting a laser beam toward the object.

The detector 3200 may be provided at a position for directly receiving light reflected from the object. The detector 3200 may include a high sensitivity APD, an SPAD, an SiPM, or the like. Also, the detector 3200 may further include a TDC for measuring a flight time of light.

Since the LiDAR system 3000 includes a structure in which light emission by the optical device 3100 and light reception by the detector 3200 are separated, when the LiDAR system 3000 is used, a reflection surface of the scanning mirror may be miniaturized, and a F-Numner of the detector 3200 may be separately designed, and thus, the light reception efficiency of the LiDAR system 3000 may be increased.

The example embodiments according to the present disclosure may provide an optical device for forming a scan area including an increased number of vertical channels by using a plurality of prisms and scanning mirrors and a LiDAR system including the same.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An optical device comprising:
   a plurality of light sources separated from each other in a vertical direction, and configured to emit laser beams in parallel in a horizontal direction;
   a light direction changing unit comprising a plurality of prisms or a plurality of mirrors provided on traveling paths of the laser beams, which travel in parallel from the plurality of light sources to the plurality of prisms or the plurality of mirrors, and configured to focus the laser beams at one point by changing travelling directions of the laser beams to form non-zero angles between the traveling paths of the laser beams at the one point; and
   a scanning mirror configured to perform two-dimensional scanning by reflecting the laser beams received from the light direction changing unit.

2. The optical device of claim 1, wherein the light direction changing unit is further configured to focus the laser beams on the one point located at the scanning mirror.

3. The optical device of claim 1, further comprising:
   a plurality of first collimators provided one by one on the traveling paths of the laser beams between the plurality of light sources and the light direction changing unit to reduce a first spread angle in a first axial direction of the laser beams; and
   a plurality of second collimators provided one by one on the traveling paths of the laser beams between the plurality of first collimators and the light direction changing unit to reduce a second spread angle in a second axial direction of the laser beams, wherein the second axial direction is different from the first axial direction.

4. The optical device of claim 3, wherein the plurality of light sources are arranged at equal intervals in the vertical direction.

5. The optical device of claim 1, wherein the scanning mirror comprises a rotation mirror configured to rotate in both directions about a first axis and a second axis perpendicular to the first axis.

6. The optical device of claim 5, wherein a first angle range of rotation of the rotation mirror with respect to the first axis is in a range from 0 degrees to M*β degrees, and a second angle range of rotation of the rotation mirror with respect to the second axis is in a range from −90 degrees to +90 degrees, and
   wherein M denotes a natural number, and β denotes an angle.

7. The optical device of claim 6, wherein a number of the plurality of light sources is N, and a number of vertical channels of a scan area by the optical device is N*M, and
   wherein N denotes a natural number.

8. The optical device of claim 4, wherein the light direction changing unit comprises the plurality of prisms.

9. The optical device of claim 8, wherein two prisms, from among the plurality of prisms, provided at positions symmetrical with respect to a center of the light direction changing unit have an exit surface of a same inclination angle.

10. The optical device of claim 8, wherein a first inclination angle of a first exit surface of a prism, from among the plurality of prisms, disposed relatively far from a center of the light direction changing unit is greater than a second inclination angle of a second exit surface of the prism disposed relatively close to the center of the light direction changing unit.

11. The optical device of claim 8, wherein a first distance between a first prism, from among the plurality of prisms, disposed at a relatively outer side with respect to a center of the light direction changing unit and the second collimator adjacent thereto is greater than a second distance between a second prism, from among the plurality of prisms, disposed at a relatively inner side with respect to the center of the light direction changing unit and the second collimator adjacent thereto.

12. The optical device of claim 8, wherein the plurality of prisms are arranged so that an inclination angle of an exit surface of each prism is sequentially increased in the vertical direction.

13. The optical device of claim 8, wherein the plurality of prisms are arranged so that distances between each prism and the point where the laser beams are focused are equal.

14. The optical device of claim 1, wherein the light direction changing unit comprises the plurality of mirrors.

15. The optical device of claim 3, wherein the plurality of first collimators and the plurality of second collimators comprise cylindrical lenses.

16. The optical device of claim 15, wherein the plurality of first collimators are integrally formed.

17. The optical device of claim 15, wherein a first collimator of the plurality of first collimators and a second collimator of the plurality of second collimators adjacent to the first collimator in the travelling directions of the laser beams are integrally formed.

18. The optical device of claim 3, further comprising:
a first aperture provided between the plurality of light sources and the plurality of first collimators to suppress divergence of the laser beams; and
a second aperture provided between the plurality of second collimators and the light direction changing unit to suppress the divergence of the laser beams.

19. The optical device of claim 1, wherein the scanning mirror comprises a polygon mirror having M reflection surfaces of different inclination angles,
wherein M denotes a natural number.

20. The optical device of claim 19, further comprising a plurality of second light sources and a second light direction changing unit that are disposed at positions symmetrical with the plurality of light sources and the light direction changing unit with the polygon mirror,
wherein the polygon mirror is disposed at a center between the positions of the plurality of second light sources and the second light direction changing unit and positions of the plurality of light sources and the light direction changing unit.

21. The optical device of claim 20, further comprising:
a first reflection mirror configured to reflect a first laser beam of the laser beams received from the light direction changing unit so that the first laser beam is incident on a first reflection surface of the polygon mirror; and
a second reflection mirror that reflects a second laser beam of the laser beams received from the second light direction changing unit so that the second laser beam is incident on a second reflection surface that is different from the first reflection surface of the polygon mirror.

22. The optical device of claim 21, wherein the first reflection mirror and the second reflection mirror are arranged to be misaligned from each other so that a number of vertical channels of the optical device is increased.

23. The optical device of claim 21, wherein the first reflection mirror and the second reflection mirror are arranged with angles to increase a total horizontal viewing angle by separating a first horizontal viewing angle by the first laser beam reflected by the first reflection mirror from a second horizontal viewing angle of the second laser beam reflected by the second reflection mirror.

24. The optical device of claim 1, further comprising:
a controller configured to generate driving signals for driving the plurality of light sources.

25. The optical device of claim 24, wherein the controller is further configured to selectively transmit the driving signals to at least two light sources separated from each other by at least one light source disposed between the at least two light sources, among the plurality of light sources.

26. A light detection and ranging (LiDAR) system comprising:
an optical device of configured to emit laser beams towards an object; and
a detector configured to receive the laser beams reflected from the object,
wherein the optical device comprises:
a plurality of light sources separated from each other in a vertical direction, and configured to emit the laser beams in parallel in a horizontal direction;
a light direction changing unit comprising a plurality of prisms or a plurality of mirrors provided on traveling paths of the laser beams, which travel in parallel from the plurality of light sources to the plurality of prisms or the plurality of mirrors, and configured to focus the laser beams at one point by changing travelling directions of the laser beams to form non-zero angles between the traveling paths of the laser beams at the one point; and
a scanning mirror configured to perform two-dimensional scanning by reflecting the laser beams received from the light direction changing unit.

27. The LiDAR system of claim 26, wherein the detector is provided at a position where the laser beams reflected from the object are directly received.

28. The LiDAR system of claim 26, wherein the detector is provided at a position where the laser beams reflected from the object are received after the laser beams reflected from the object are re-incident on a reflection surface of the scanning mirror, and
the reflection surface of the scanning mirror is configured to reflect the laser beams emitted from the plurality of light sources to the object.

* * * * *